(12) United States Patent
Hondo

(10) Patent No.: US 6,768,912 B2
(45) Date of Patent: Jul. 27, 2004

(54) RADIO BASE STATION APPARATUS WITH INTER-SHELF COMMUNICATION

(75) Inventor: Shinya Hondo, Tokyo (JP)

(73) Assignee: NEC Corporation, Tokyo (JP)

( * ) Notice: Subject to any disclaimer, the term of this patent is extended or adjusted under 35 U.S.C. 154(b) by 692 days.

(21) Appl. No.: 09/795,319

(22) Filed: Mar. 1, 2001

(65) Prior Publication Data

US 2001/0021660 A1 Sep. 13, 2001

(30) Foreign Application Priority Data

Mar. 1, 2000 (JP) ........................................ 2000-055114

(51) Int. Cl.$^7$ ................................................. H04B 1/38
(52) U.S. Cl. ........................ 455/560; 455/561; 370/342; 375/222
(58) Field of Search ................................ 455/561, 507, 455/560; 370/280, 295, 342, 343, 344, 345; 375/222, 219, 130

(56) References Cited

U.S. PATENT DOCUMENTS

| | | | |
|---|---|---|---|
| 5,329,548 A | | 7/1994 | Borg |
| 6,021,331 A | * | 2/2000 | Cooper et al. ............... 455/507 |
| 6,188,912 B1 | * | 2/2001 | Struhsaker et al. .......... 455/561 |
| 6,351,633 B1 | * | 2/2002 | Meakes ........................ 455/403 |

FOREIGN PATENT DOCUMENTS

| | | |
|---|---|---|
| DE | 197 55 379 | 6/1999 |
| EP | 0 991 289 | 4/2000 |
| JP | 3-120917 | 5/1991 |
| JP | A 4-100414 | 4/1992 |
| JP | 5-31968 | 5/1993 |
| JP | A 9-247744 | 9/1997 |
| JP | 10-65579 | 3/1998 |
| JP | 11-313012 | 11/1999 |
| JP | 11-3415547 | 12/1999 |

* cited by examiner

Primary Examiner—Edward F. Urban
Assistant Examiner—Blane J. Jackson
(74) Attorney, Agent, or Firm—Young & Thompson

(57) ABSTRACT

A radio base station apparatus includes first and second shelves having a similar structure, each shelf includes a shelf current use system transmission signal processing circuit, a shelf standby system transmission signal processing circuit and a shelf radio transmitting section. The shelf current use system transmission signal processing circuits generate a inter-shelf signal from a shelf current use system baseband signal, and generate a shelf current use system spread signal from the shelf current use system baseband signal and another inter-shelf signal. The shelf standby system transmission signal processing circuits generate a inter-shelf signal from a shelf standby system baseband signal, and generate a shelf standby system spread signal from the shelf standby system baseband signal and another inter-shelf signal. The shelf radio transmitting sections generate a shelf radio signal from the shelf current use system spread signal and the shelf standby system spread signal to transmit.

15 Claims, 15 Drawing Sheets

Fig. 6

| STATUS | INPUT | | | | OUTPUT | | | |
|---|---|---|---|---|---|---|---|---|
| | INTRA ALARM SIGNAL (H: GIVEN / L: CANCELED) | SWITCHING REQUEST SIGNAL (INPUT) (H: GIVEN / L: CANCELED) | OTHER SHELF INTRA SYSTEM ALARM SIGNAL (H: GIVEN / L: CANCELED) | OTHER SHELF OTHER SYSTEM ALARM SIGNAL (H: GIVEN / L: CANCELED) | INTRA SHELF INTRA FAULT DATA CONTROL SIGNAL (H: GIVEN / L: CANCELED) | OTHER SHELF INTRA FAULT DATA CONTROL SIGNAL (H: GIVEN / L: CANCELED) | STANDBY SYSTEM DATA AMPLITUDE 0 CONTROL SIGNAL (H: GIVEN / L: CANCELED) | SWITCHING REQUEST SIGNAL (OUTPUT) (H: GIVEN / L: CANCELED) |
| 1 | L | L | L | L | L | L | H | L |
| 2 | L | H | L | L | L | L | L | L |
| 3 | L | L | L | H | L | L | H | L |
| 4 | L | H | L | H | L | L | L | L |
| 5 | L | L | H | L | L | H | H | H |
| 6 | L | H | H | L | L | L | H | L |
| 7 | L | L | H | H | L | H | H | L |
| 8 | L | H | H | H | L | L | H | H |
| 9 | H | L | L | L | H | L | H | H |
| 10 | H | H | L | L | H | L | H | H |
| 11 | H | L | L | H | H | L | H | H |
| 12 | H | H | L | H | H | L | H | H |
| 13 | H | L | H | L | H | H | H | H |
| 14 | H | H | H | L | H | L | H | H |
| 15 | H | L | H | H | H | L | H | H |
| 16 | H | H | H | H | H | L | H | H |

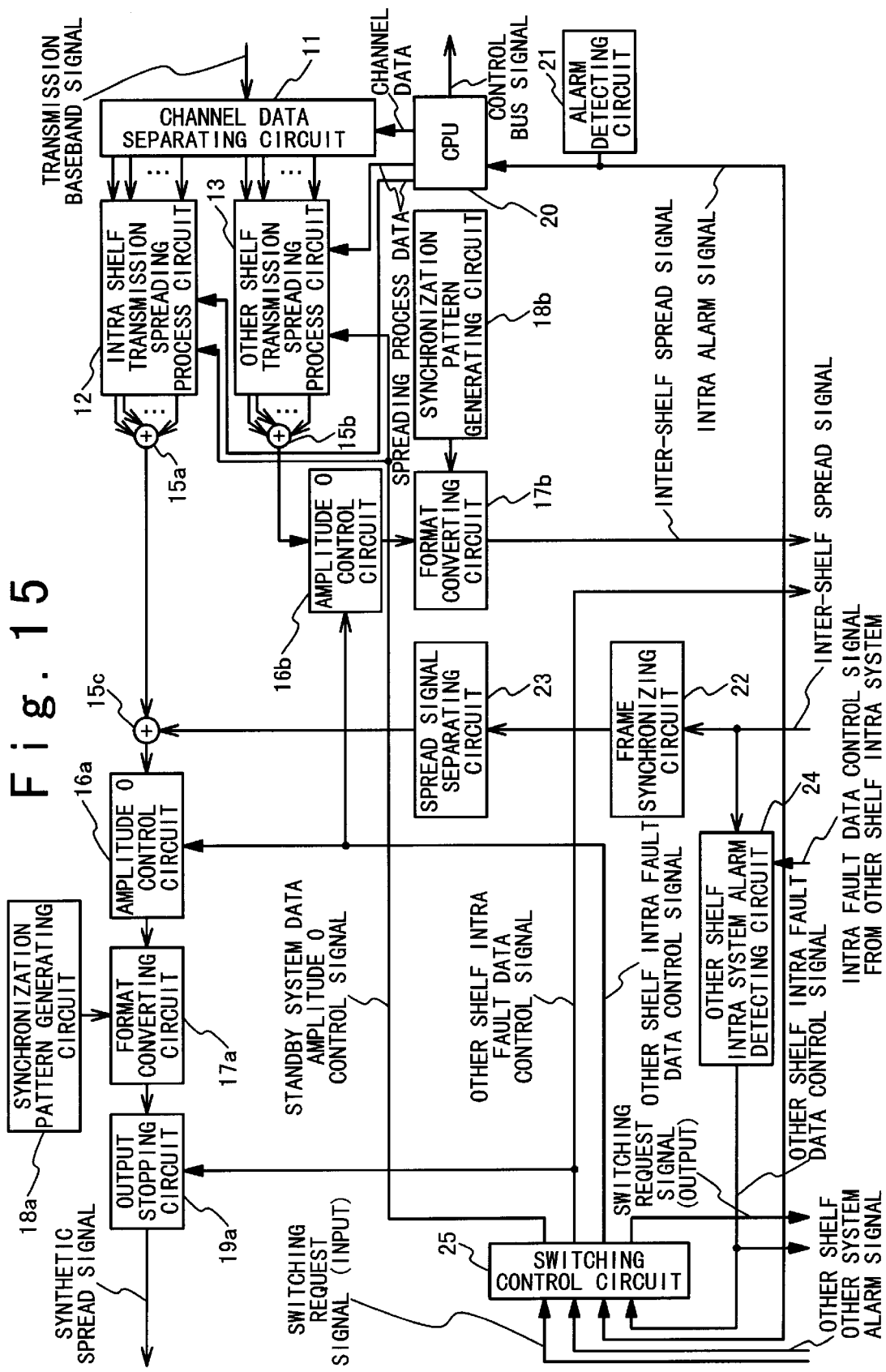

RADIO BASE STATION APPARATUS WITH INTER-SHELF COMMUNICATION

BACKGROUND OF THE INVENTION

1. Field of the Invention

The present invention relates to a radio base station apparatus for a mobile communication, in which communication is carried out on the basis of a code division multiple access (CDMA) method using spectrum spreading technique for a radio transmission.

2. Description of the Related Art

FIG. 1 shows a configuration example of a conventional radio base station apparatus in such a CDMA method. A radio base station apparatus 1 shown in FIG. 1 is composed of a call process & monitor controlling circuit 4 and shelves 2 and 3. The shelf is a unit in which the processes such as generation, spreading, and transmission of a transmission signal are controlled within the radio base station apparatus.

The call process & monitor controlling circuit 4 carries out the monitor and control of a state within the radio base station apparatus, resource management of a channel, and connection of a control call with respect to the control of origination and arrival.

The shelves 2 and 3 have the same configuration. Hereinafter, the shelf 2 will be described. Each of channel coding process circuits 6a and 6b receives a coding process data from the call process & monitor controlling circuit 4, and generates a transmission baseband signal. The coding process data is the data such as control data, user data of voice and packets, and data indicative of a kind of channel for carrying these data. Each of the channel coding process circuits 6a and 6b has units whose number corresponds to the number of channels. Each of merging circuits 7a and 7b merges the transmission baseband signals outputted from the channel coding process circuits 6a and 6b. Transmission signal processing circuits 5a and 5b spread and modulate the transmission baseband signals outputted from the merging circuits 7a and 7b, respectively. A radio transmission processing circuit 8a synthesizes and adds transmission spreading signals outputted from the transmission signal processing circuits 5a and 5b, and carries out orthogonal modulation, radio frequency conversion and amplification, and outputs a radio transmission signal from an antenna 9a. The radio transmission processing circuits 8a and 8b up-converts the transmission spreading signals to have radio transmission frequencies different from each other.

The shelf 2 receives and outputs a control signal as well as a data to be sent. The channel coding process circuits 6a and 6b and the transmission signal processing circuits 5a and 5b receive and output data such as coding process data, spreading process data, control data, and status data through a control bus from and to the call process & monitor controlling circuit 4. The spreading process data is a spreading code used when the transmission signal processing circuits 5a and 5b carry out the spreading modulation. Also, the transmission signal processing circuits 5a and 5b mutually receive and output an alarm signal when a fault has occurred.

The configuration and operation of the shelf 3 are similar to those of the shelf 2.

FIG. 2 is a block diagram showing a conventional configuration example of the transmission signal processing circuit 5a to 5d in the radio base station apparatus shown in FIG. 1. The respective transmission signal processing circuits have the same configuration. Here, only the transmission signal processing circuit 5a will be described. In FIG. 2, channel data separating circuit 11 separates individual channels from a transmission baseband signal, in which time divisional multiplexing is carried out to data for a plurality of channels received from the merging circuit 7a, in accordance with a channel data received from a CPU 20, and converts into a user data corresponding to a data rate for each user, and then outputs to an intra shelf transmission spreading process circuit 12. As described later, the intra shelf transmission spreading process circuit 12 has a current use system spreading circuit and a standby system spreading circuit. The channel data is the data to determine whether each user data should be processed by the current use system spreading circuit or the standby system spreading circuit. The intra shelf transmission spreading process circuit 12 carries out the spreading modulation to a plurality of user data whose data rates are different from each other, in accordance with a spreading process data (spreading code) received from the CPU 20, and outputs a spread signal for each user to an addition synthesizer 15d.

The addition synthesizer 15d adds all the spread signals for the respective users to output to a format converter 17c. A synchronous pattern generating circuit 18c generates a synchronous pattern to output to the format converter 17c. The format converter 17c carries out an insertion of the synchronous pattern into the spread signal, and converts the spread signal to have a format adaptive for the transmission to the radio transmission processing circuit 8a. The format converter 17c outputs the spread signal on which the format conversion is carried out, as a transmission spread signal, through an output stopping circuit 19c to the radio transmission processing circuit 8a.

When a fault has occurred in the transmission signal processing circuit 5a, an alarm detecting circuit 21 detects the fault. The alarm detecting circuit 21 outputs an alarm signal to the output stopping circuit 19c, the CPU 20 and the intra shelf transmission spreading process circuit 12 of the other transmission signal processing circuit 5b in the intra shelf (shelf 2). The intra shelf transmission spreading process circuit 12 in the transmission signal processing circuit 5a receives an alarm signal from the alarm detecting circuit 21 in the transmission signal processing circuit 5b when the fault has occurred in the transmission signal processing circuit 5b.

When receiving the alarm signal from the alarm detecting circuit 21, the output stopping circuit 19c sets an output bus to a high impedance state, and stops the data output.

The intra shelf transmission spreading process circuit 12 has the current use system spreading circuit and the standby system spreading circuit. The current use system spreading circuit carries out a spreading process to the user data in the current use system received from the channel data separating circuit 11. The standby system spreading circuit carries out the spreading process to the user data in the standby system. Usually, the intra shelf transmission spreading process circuit 12 fixes the amplitude of a signal processed by the standby system spreading circuit to 0. However, the intra shelf transmission spreading process circuit 12 cancels the 0-fixation of the amplitude of the signal processed by the standby system spreading circuit, when receiving the alarm signal from the transmission signal processing circuit 5b (namely, when a fault has occurred in the other transmission signal processing circuits within the intra shelf).

The CPU 20 notifies the status data of the transmission signal processing circuit 5a to the call process & monitor controlling circuit 4 through the control bus, and receives the control data from the call process & monitor controlling circuit 4.

The configurations and operations of the transmission signal processing circuits 5b to 5d are similar to those of the transmission signal processing circuit 5a.

In the radio base station apparatus shown in FIG. 1, any channel data separating circuit 11 of the transmission signal processing circuits 5a and 5b receives the transmission baseband signals outputted by the channel coding process circuits 6a and 6b. Then, in accordance with the channel data, the channel data separating circuit 11 of the transmission signal processing circuit 5a determines the user data to be outputted from the transmission signal processing circuit 5a, as a data corresponding to the current use system, and determines the user data to be outputted from another transmission signal processing circuit 5b within the intra shelf, as a data corresponding to the standby system. Also, the channel data separating circuit 11 of the transmission signal processing circuit 5b similarly determines the respective user data for the current use system and the standby system.

In the transmission signal processing circuits 5a and 5b, the output signals from the channel coding process circuits 6a and 6b are spread in the normal state by the current and standby system spreading circuits in the respective intra shelf transmission spreading process circuits 12. However, the amplitude of the signal processed by the standby system spreading circuit is fixed to 0. If a fault has occurred in the transmission signal processing circuit 5a, the output stopping circuit 19c of the transmission signal processing circuit 5a receives the alarm signal, and stops the data output. Also, the intra shelf transmission spreading process circuit 12 of the transmission signal processing circuit 5b receives the alarm signal, and cancels the 0-fixation of the amplitude of the signal processed by the standby system spreading circuit, and then outputs the spread signal which is processed by the standby system spreading circuit and should be originally outputted from the transmission signal processing circuit 5a.

As mentioned above, in the radio base station apparatus shown in FIG. 1, the spreading process is carried out in the normal state by both the transmission signal processing circuits 5a and 5b. If any fault has occurred in one of the circuits 5a and 5b, the spreading processes to be carried out by the transmission signal processing circuits 5a and 5b are carried out only by one of the transmission signal processing circuits 5a and 5b in the normal state. The configuration in which the duplicated two transmission spreading processes (the transmission signal processing circuits 5a and 5b) as mentioned above are carried out in the normal state, and when the fault has occurred in one of the circuits 5a and 5b, only the circuit in the normal state carries out all the transmission spreading processes carried out by the two transmission spreading processes is referred to as a 0/1 configuration. Also, among them, one system is referred to as a 0-system, and the other system is referred to as a 1-system. In the 0/1 configuration, if a fault has occurred in one of the 0-system and the 1-system in the duplex structure, the normal system needs to have a function of compensating the spreading process. In the radio base station apparatus shown in FIG. 1, if the fault has occurred in the 0-system, the standby system spreading circuit within the 1-system compensates the 0-system. If the fault has occurred in the 1-system, the standby system spreading circuit within the 0-system compensates the 1-system.

Three methods including the configuration shown in FIG. 1 may be considered as the typical duplex configuration.

FIG. 3 shows the configuration in the first method. In the configuration shown in FIG. 3, the spreading process in each of the transmission signal processing circuits 5a and 5b is not divided into the current use system and the standby system. One of the duplex transmission signal processing circuits 5a and 5b serves as the current use system to carry out the spreading process. The other is in a wait state as the standby system, and does not contribute to the transmission spreading process. If any fault has occurred in the current use system, the switching is carried out between the standby system and the current use system. Also, as shown in FIG. 3, the transmission baseband signals outputted from the channel coding process circuits 6a and 6b are not merged, and are supplied to the transmission signal processing circuits 5a and 5b.

In such a method, it is necessary to design a hardware configuration in which the transmission signal processing circuit serving as the standby system stands by while carrying out the perfectly same process as the transmission signal processing circuit in the current use system. Thus, if the number of units in the channel coding process circuits 6a and 6b is increased in conjunction with the increase in the number of channels, the number of input signal lines to the channel data separating circuit in each transmission signal processing circuit is increased, which makes the circuit configuration of the channel data separating circuit complex and large, and makes it expensive.

The second method is the method using the 0/1 configuration described in FIG. 1. The second method is designed as follows. That is, the plurality of units of the channel coding process circuit are divided into two sections, which are set to the transmission signal processing circuits of the 0-system and the 1-system. Thus, the number of input signal lines supplied to the channel data separating circuit in each transmission signal processing circuit can be half the number of the first method. Also, in order that if any fault has occurred in one of the systems, the other system in the normal state carries out the process of the system, the outputs of the halved channel coding process circuits is multiplexed, and a transmission rate of a data are multiplexed. Hence, the data having the same amount as the first method is supplied to each channel data separating circuit.

The third method has the configuration similar to that of the second method. In the third method, one of the duplex transmission signal processing circuits 5a and 5b serves as the current use system and carries out the spreading process. If any fault has occurred in the transmission signal processing circuits carrying out the spreading process as the current use system, the switching is carried out between the standby system and the current use system. The third method requires the switching to the standby system when the fault has occurred in the channel coding process circuit physically connected to the transmission signal processing circuits in the current use system. For this reason, the third method has a defect that the switching sequence at this time becomes complex. Also, it is necessary that a merging circuit for merging a signal outputted from the channel coding process circuit corresponding to the other system is connected to each transmission signal processing circuits. Thus, various restrictions are put on a time of installation, a time of the fault occurrence, a time of maintenance and the like. Therefore, this implies the lack of flexibility of an apparatus. Even if an integral circuit of the channel coding process circuit and the merging circuit is used, this circuit must be connected to each transmission signal processing circuits.

As mentioned above, the second method shown in FIG. 1 has the following problems although it is superior to the first and third methods. The first problem is that the resources such as the channel coding process circuit, the spreading process circuit and the radio transmission processing circuit, which can be flexibly used, are limited to the internal portion of the shelf. The above resource implies the number of users that can be simultaneously processed by the respective circuits. In the second method, even if the number of users is increased in one shelf so that it becomes close to a limit value, the user data cannot be distributed to the other shelf.

The second problem is as follows. That is, when the control is carried out over the shelves, it is necessary to carry out a software process through the CPUs 20 in the transmission signal processing circuits 5a to 5d and the call process & monitor controlling circuit 4. Thus, the processing times in the switching control becomes longer.

In conjunction with the above description, a radio base station transceiver control system is disclosed in Japanese Laid Open Patent Application (JP-A-Heisei 3-120917). In this reference, a radio base station is composed of a plurality of transceivers, each of which includes a transmitter for a radio control channel and a receiver corresponding to the transmitter. Each of the transmitter and the receiver has a switching function between a current use mode and a standby mode independently.

Also, a time divisional multiple access radio communication system is disclosed in Japanese Laid Open Patent Application (JP-A-Heisei 5-31968). In this reference, there are two transceivers for the system has a current use system and a standby system. When alarm signals indicative of faults are generated at a same time from the current use system and the standby system, a system is switched between the current use system and the standby system for every time interval. At this time, a transceiver in which a fault has occurred is detected based on the alarm signal and the other transceiver is automatically set to the current use system.

Also, a duplex apparatus of a radio communication system is disclosed in Japanese Laid Open Patent Application (JP-A-Heisei 10-65579). In this reference, the duplex apparatus is composed of a main signal distributor 11 which has an interface 15 for one direction communication and an interface 16 for bi-direction communication, base stations 17 to 19, communication lines 107, 110 for connecting between the main signal distributor 11 and the radio base station 17 and between the main signal distributor 11 and the n-th (n is an integer equal to or more than 2) radio base station 19, and communication lines 108, 109 between the radio base stations 17 and 18 and 18 and 19. When there is a fault on the communication line between the radio base stations 17 and 18, the main signal distributor 11 sends out a signal of the same content to the interfaces 15, 16, after instructing the communication direction of the communication line to the n-th radio base station 19 and the second radio base station 18 from the interface 16.

Also, a transmission system for a base station is disclosed in Japanese Laid Open Patent Application (JP-A-Heisei 11-313012). In this reference, when a fault has occurred in a synchronization compensation section 8 (SYS4) while a standby synchronization compensation section 10 carries out a synchronization compensation processing for the SYS3 system in place of a synchronization compensation section 7 (SYS3) because a fault has occurred in the synchronization compensation section 7, data of SYS4 is taken in by the other system decoder section of the standby synchronization compensation section 10. An output connection control unit of the standby synchronization compensation section 10 is set to be connected with one output to the output of a transmission apparatus 13 of SYS3, and the other output to the output of the transmission apparatus 14 of SYS4.

Also, a radio base station control system is disclosed in Japanese Laid Open Patent Application (JP-A-Heisei 11-341547). In the reference, a first radio apparatus is composed of a first operation channel radio section for carrying out radio transmission and reception on a current use channel, a first current use channel radio control section for carrying out operation control at the first operation channel radio section, a first maintenance channel radio section for carrying out radio transmission and reception on a maintenance channel, a first maintenance channel radio control section for carrying out operation control at the first maintenance channel radio section, and a first radio base station control unit for controlling the first maintenance channel radio control section of the first current use channel radio control section. A second radio apparatus is composed of a second current use channel radio section for carrying out radio transmission and reception on a current use channel, a second current use channel radio control section for carrying out operation control at the second operation channel radio section, a second maintenance channel radio section for carrying out radio transmission and reception on a maintenance channel, a second maintenance channel radio control section for carrying out operation control at the second maintenance channel radio section, and a second radio base station control unit for controlling the second maintenance channel radio control section of the second current use channel radio control section. The radio base station control apparatus is composed of the first radio apparatus, the second radio apparatus, a first power supply section for supplying said first radio apparatus with power, a second power supply section for supplying the second radio apparatus with power, and a control board for the base station having the function to selectively connect with the first and second radio base station control units and to carry out and monitor the operation control of the first and second radio apparatuses. The first and second radio base station control unit detect the existence or non-existence of the fault in the first and second radio apparatuses by self monitor and mutual monitor of said and 2nd radio apparatus and set one to a current use system, and the other to standby system.

SUMMARY OF THE INVENTION

Therefore, an object of the present invention is to provide a radio base station apparatus which carries out the control over the shelves in a short time.

Another object of the present invention is to provide a radio base station apparatus which has a redundant configuration.

Still another object of the present invention is to provide a radio base station apparatus which effectively controls the resources such as channel coding process circuits, spreading process circuits, and a radio transmission processing circuit.

Yet still another object of the present invention is to provide a radio base station apparatus which uses inter-shelf communication.

In an aspect of the present invention, a radio base station apparatus includes first and second shelves. The first shelf includes a first shelf current use system transmission signal processing circuit, a first shelf standby system transmission signal processing circuit and a first shelf radio transmitting section. The first shelf current use system transmission signal processing circuit generates a first inter-shelf signal from a first shelf current use system baseband signal, and generates a first shelf current use system spread signal from the first shelf current use system baseband signal and a second inter-shelf signal. The first shelf standby system transmission signal processing circuit generates a third inter-shelf signal from a first shelf standby system baseband signal, and generates a first shelf standby system spread signal from the first shelf standby system baseband signal and a fourth inter-shelf signal. The first shelf radio transmitting section has a first shelf antenna and generates a first shelf radio signal from the first shelf current use system spread signal and the first shelf standby system spread signal to transmits from the first shelf antenna. The second shelf includes a second shelf current use system transmission signal processing circuit, a second shelf standby system transmission signal processing circuit and a second shelf radio transmitting section. The second shelf current use system transmission signal processing circuit generates the second inter-shelf signal from a second shelf current use system baseband signal, and generates a second shelf current use system spread signal from the second shelf current use system baseband signal and the first inter-shelf signal. The second shelf standby system transmission signal processing circuit generates the fourth inter-shelf signal from a second shelf standby system baseband signal, and generates a second shelf standby system spread signal from the second shelf standby system baseband signal and the third inter-shelf signal. The second shelf radio transmitting section has a second shelf antenna and generates a second shelf radio signal from the second shelf current use system spread signal and the second shelf standby system spread signal to transmits from the second shelf antenna.

The first shelf current use system transmission signal processing circuit includes a first output control circuit, a detecting circuit and a control circuit. The first output control circuit stops output of the first shelf current use system spread signal in response to an output stop control signal. The detecting circuit detects a fault in the first shelf current use system transmission signal processing circuit to generate an intra alarm signal. The control circuit outputs the output stop control signal to the first output control circuit in response to the intra alarm signal.

In this case, the transmission signal processing circuit may further include a second output control circuit which stops output of the first inter-shelf signal in response to the output stop control signal.

Also, the first shelf current use system transmission signal processing circuit may further include a first amplitude control circuit which controls a spread signal corresponding to the first shelf current use system spread signal in response to a second shelf current use system fault signal such that amplitude of the spread signal is 0. The control circuit outputs the second shelf current use system fault signal to the first amplitude control circuit when the intra alarm signal or an alarm signal indicating a fault of the second shelf current use system transmission signal processing circuit is present and a switching signal from the first shelf standby system transmission signal processing circuit and an alarm signal indicating a fault of the second shelf standby system transmission signal processing circuit are not present.

In this case, the transmission signal processing circuit may further include a second output control circuit which stops output of the first inter-shelf signal in response to the output stop control signal.

Also, the first shelf current use system transmission signal processing circuit may further include a second amplitude control circuit which controls a spread signal corresponding to the first inter-shelf signal in response to the second shelf current use system fault signal such that amplitude of the spread signal is 0.

Also, the first shelf current use system transmission signal processing circuit may further include an alarm detecting circuit which generates the alarm signal indicating the fault of the second shelf current use system transmission signal processing circuit based on no reception of the second inter-shelf signal from the second shelf current use system transmission signal processing circuit. Alternatively, the first shelf current use system transmission signal processing circuit may include an alarm detecting circuit which generates the alarm signal indicating the fault of the second shelf current use system transmission signal processing circuit based on an intra alarm signal generated in the second shelf current use system transmission signal processing circuit.

Also, the first shelf current use system transmission signal processing circuit may include a channel separating circuit, a first processing circuit and a second processing circuit. The channel separating circuit separates the first shelf current use system baseband signal into first and second channel signals. The first processing circuit spreads and synthesizes the first channel signals into a first spread signal. The second processing circuit spreads and synthesizes the second channel signals into a second spread signal to output as the first inter-shelf signal.

Here, each of the first and second processing circuits may include a current use system spreading circuit and a standby system spreading circuit. In this case, each of the first and second processing circuits may set to 0, amplitude of each of spread signals spread by a corresponding one of the standby system spreading circuits when the intra alarm signal of the first shelf current use system transmission signal processing circuit is not present and a switching request signal from the first shelf standby system transmission signal processing circuit is not present, and synthesize the spread signals spread signals spread by the corresponding standby system spreading circuit without setting the amplitudes to 0, when the intra alarm signal of the first shelf current use system transmission signal processing circuit or the switching request signal from the first shelf standby system transmission signal processing circuit is present.

Alternatively, the first shelf current use system transmission signal processing circuit may further include a synthesizing circuit which synthesizes the first spread signal and an other spread signal as the second inter-shelf signal into a spread signal corresponding to the first shelf current use system spread signal.

Also, the first shelf current use system transmission signal processing circuit may include a channel separating circuit, a first processing circuit and a second processing circuit. The channel separating circuit separates the first shelf current use system baseband signal into first and second channel signals. The first processing circuit spreads and synthesizes the first channel signals into a first spread signal. The second processing circuit converts the second channel signals into a baseband signal as the first inter-shelf signal.

Here, the first processing circuit may include a current use system spreading circuit and a standby system spreading circuit. In this case, the first processing circuit may set to 0, amplitude of each of spread signals spread by the standby system spreading circuit when the intra alarm signal of the first shelf current use system transmission signal processing circuit is not present and a switching request signal from the first shelf standby system transmission signal processing circuit is not present, and synthesize the spread signals spread signals spread by the standby system spreading circuit without setting the amplitudes to 0, when the intra alarm signal of the first shelf current use system transmission signal processing circuit or the switching request signal from the first shelf standby system transmission signal processing circuit is present.

Also, the first shelf current use system transmission signal processing circuit may further include a synthesizing circuit which synthesizes the first spread signal and an other spread signal obtained from the second inter-shelf signal into a spread signal corresponding to the first shelf current use system spread signal.

Also, the first shelf current use system transmission signal processing circuit may further include a second processing circuit which separates the second inter-self signal into third channel signals, and spreads and synthesizes the third channel signals into the other shelf spread signal.

BRIEF DESCRIPTION OF THE DRAWINGS

FIG. 6 is a truth value table of a switching control circuit of the transmission signal processing circuit of FIG. 5;

FIG. 15 is a block diagram showing an example of the structure of the transmission signal processing circuit of the second embodiment of the present invention.

DESCRIPTION OF THE PREFERRED EMBODIMENTS

Hereinafter, a radio base station apparatus of the present invention will be described below with reference to the attached drawings.

Figure 1:
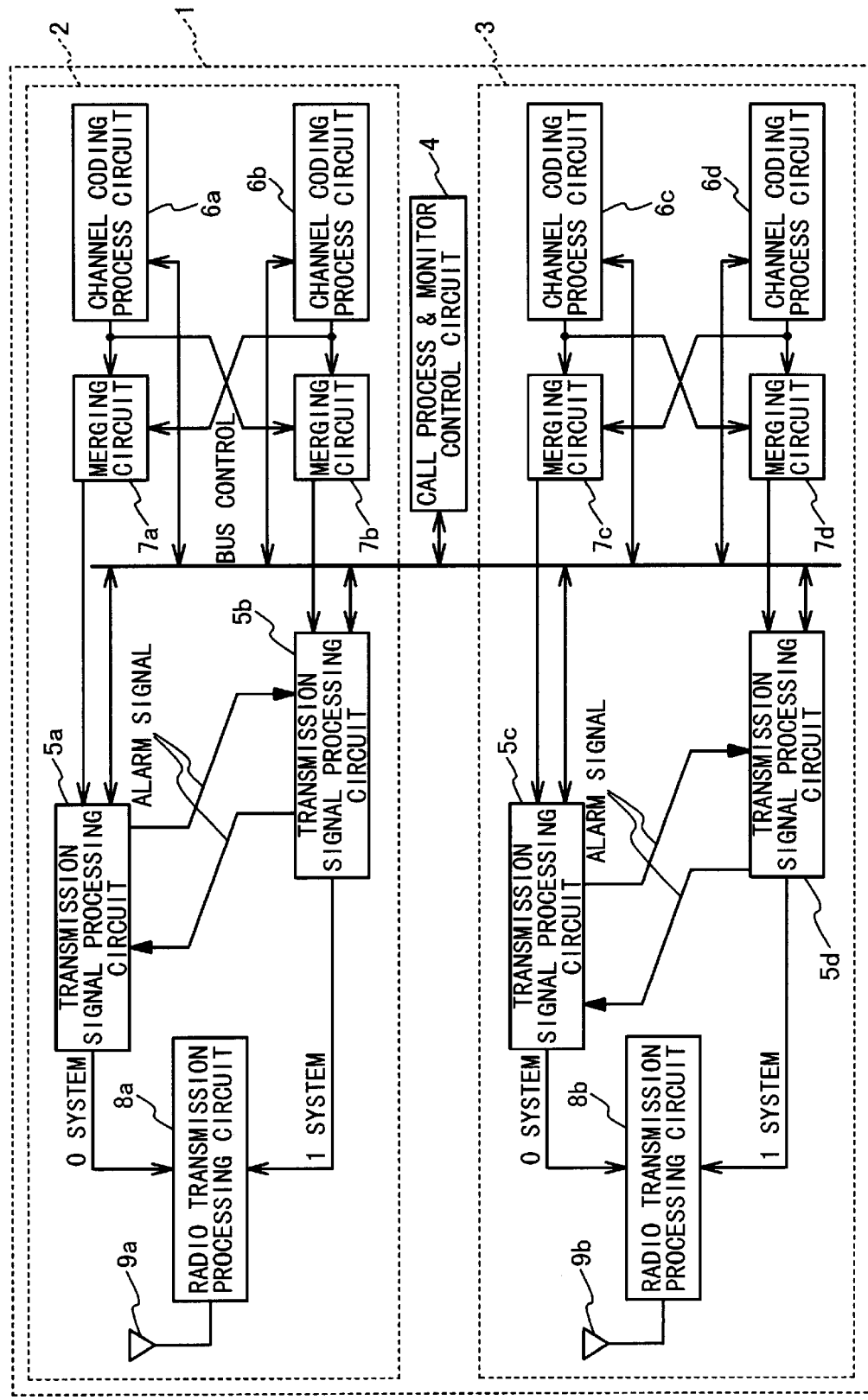
FIG. 1 is a block diagram showing an example of the structure of a conventional general radio base station apparatus.
Figure 2:
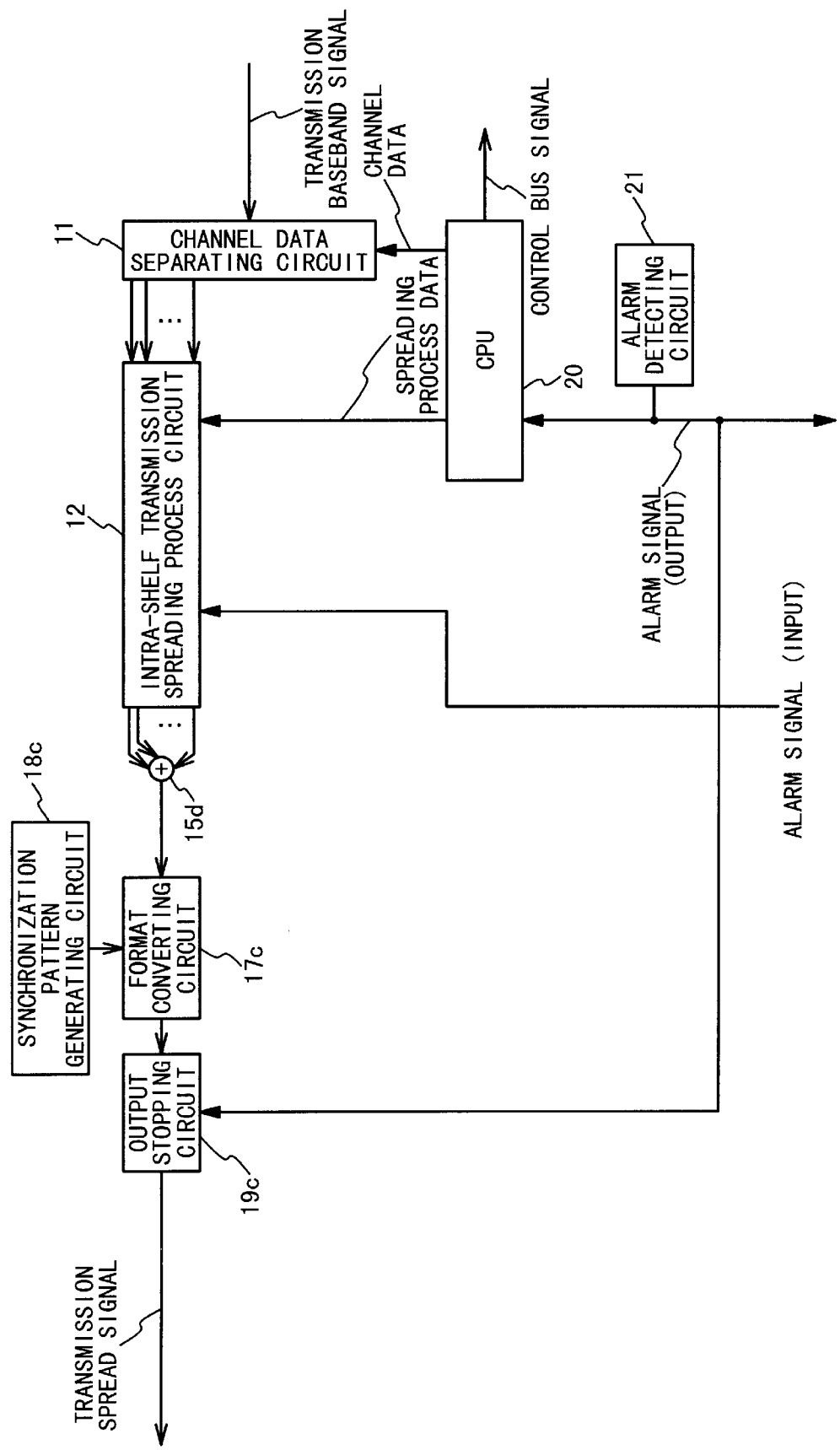
FIG. 2 is a block diagram showing an example of the structure of a conventional general transmission signal processing circuit used in the conventional general radio base station apparatus.
Figure 3:
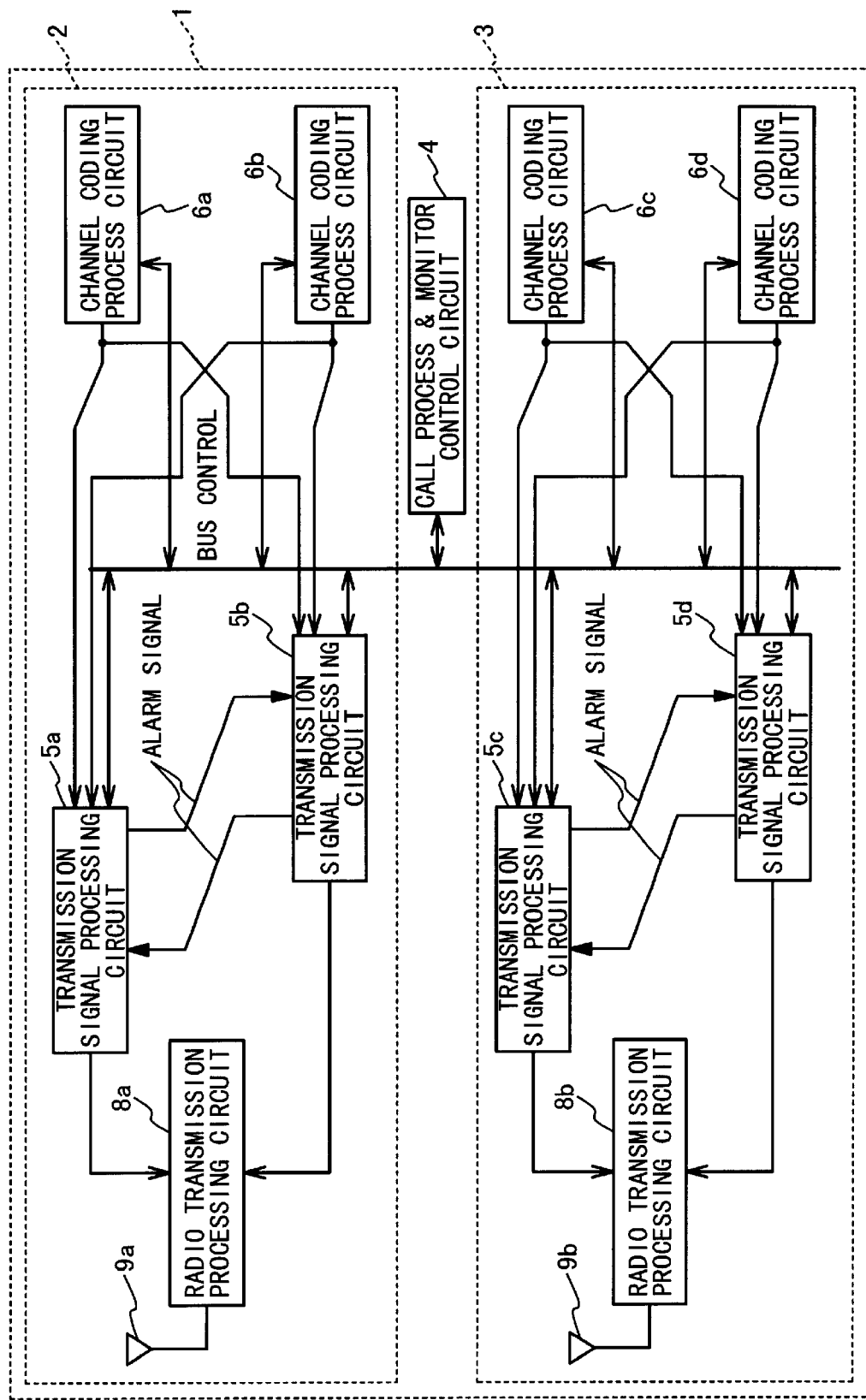
FIG. 3 is a block diagram showing an example of the structure of another conventional general radio base station apparatus.
Figure 4:
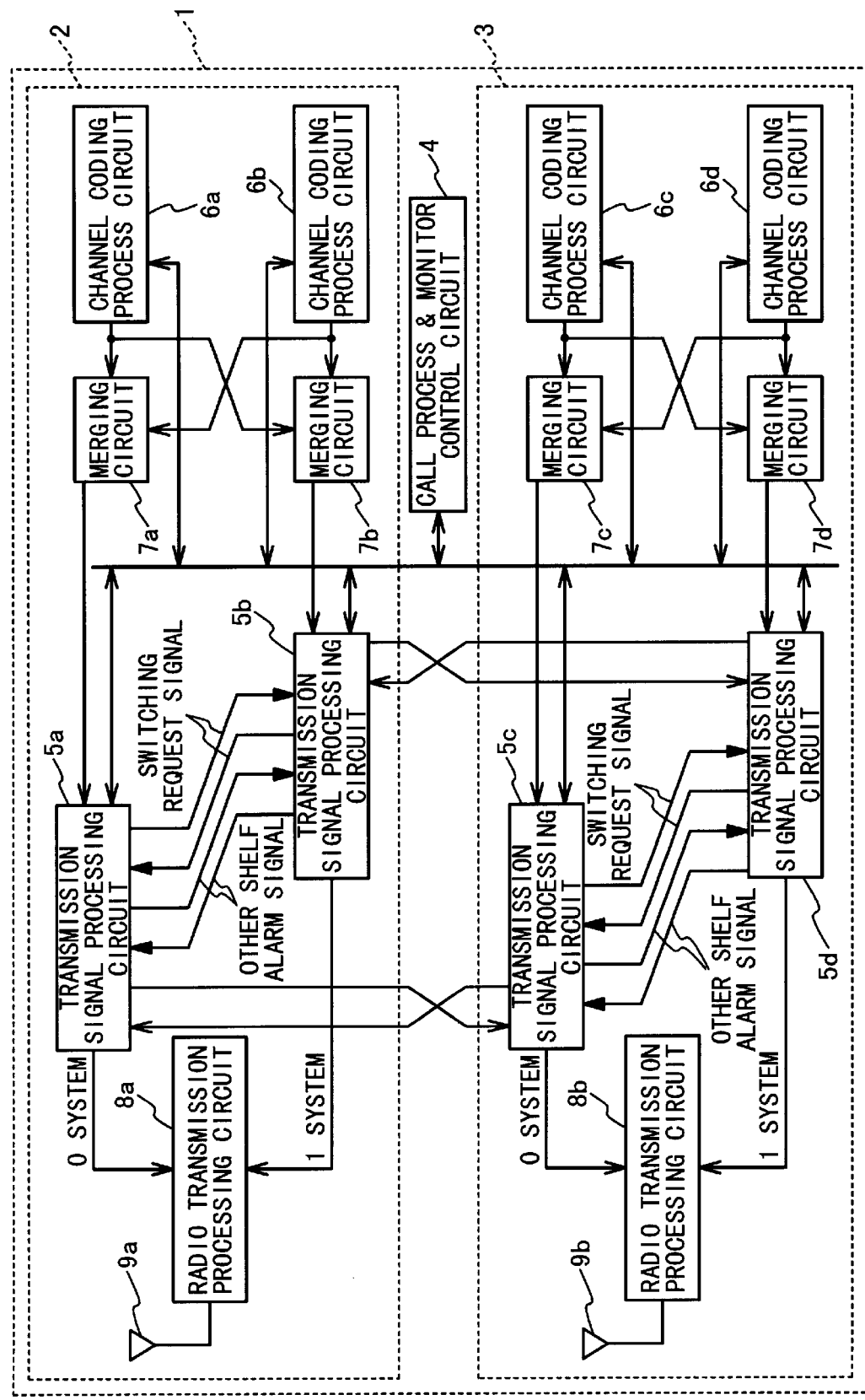
FIG. 4 is a block diagram showing a radio base station apparatus according to a first embodiment of the present invention.

FIG. 4 is a block diagram showing a radio base station apparatus according to a first embodiment of the present invention. The radio base station apparatus 1 is compose of shelves 2 and 3 and a call process & monitor control circuit 4. The control circuit 4 carries out the monitor and control of the state of the radio base station apparatus, the resource management of a channel, and connection of the control call with regard to the origination/arrival control. The shelves 2 and 3 have the same configuration. Here, the shelf 2 will be described. Each of channel coding process circuits 6a and 6b generates a transmission baseband signal. Merging circuits 7a and 7b merge the transmission baseband signals outputted from the respective channel coding process circuits 6a and 6b.

Each of Transmission signal processing circuits 5a and 5b divides the transmission baseband signal outputted from a corresponding one of the merging circuits 7a and 7b into a signal for an intra shelf transmission and a signal for the other shelf transmission, and carries out spreading modulation. Also, the respective transmission signal processing circuits 5a and 5b are connected through cables to respective transmission signal processing circuit 5c and 5d in the other shelf 3. A spread signal for the other shelf transmission (hereafter, referred to as an inter-shelf spread signal) is inputted and outputted through this cable. When receiving the inter-shelf spread signal from the corresponding one of the transmission signal processing circuits 5c and 5d, the each of the transmission signal processing circuits 5a and 5b adds and synthesizes the inter-shelf spread signal and the transmission spread signal after the spreading modulation.

The input/output of the inter-shelf spread signal between the shelves 2 and 3 is carried out when the transmission baseband signal generated by the intra shelf is desired to be sent at a transmission frequency of the other shelf. For example, it is supposed that the shelf 2 is short of the resources of the spreading process circuits in the transmission signal processing circuits 5a and 5b and the channel coding process circuits 6a and 6b or a fault has occurred in a radio transmission processing circuit 8a or an antenna 9a. In this case, each of the transmission signal processing circuits 5a and 5b outputs the transmission spread signal to a corresponding one of the respective transmission signal processing circuits 5c and 5d in the shelf 3.

The radio transmission processing circuit 8a adds and synthesizes the transmission spread signals received from the transmission signal processing circuits 5a and 5b. Then, the radio transmission processing circuit 8a carries out orthogonal modulation, radio frequency conversion and amplification, to output a radio transmission signal from the antenna 9a. Each of the radio transmission processing circuits 8a and 8b up-converts the transmission spread signals to have radio transmission frequencies different from each other.

The reception/output of the control signal in the shelf 2 will be described below. The channel coding process circuits 6a and 6b and the transmission signal processing circuits 5a and 5b receive and output data such as the coding process data, spreading process data, data control data, and status data through a control bus from and to the call process & monitor controlling circuit 4. Also, the transmission signal processing circuits 5a and 5b mutually receive and output switching request signals and other shelf alarm signals. The switching request signal and the other shelf alarm signal are the signals that are used to change the setting of the other transmission signal processing circuit in the intra shelf when the fault has occurred.

The configuration and operation of the shelf 3 are similar to those of the shelf 2.

Figure 5:
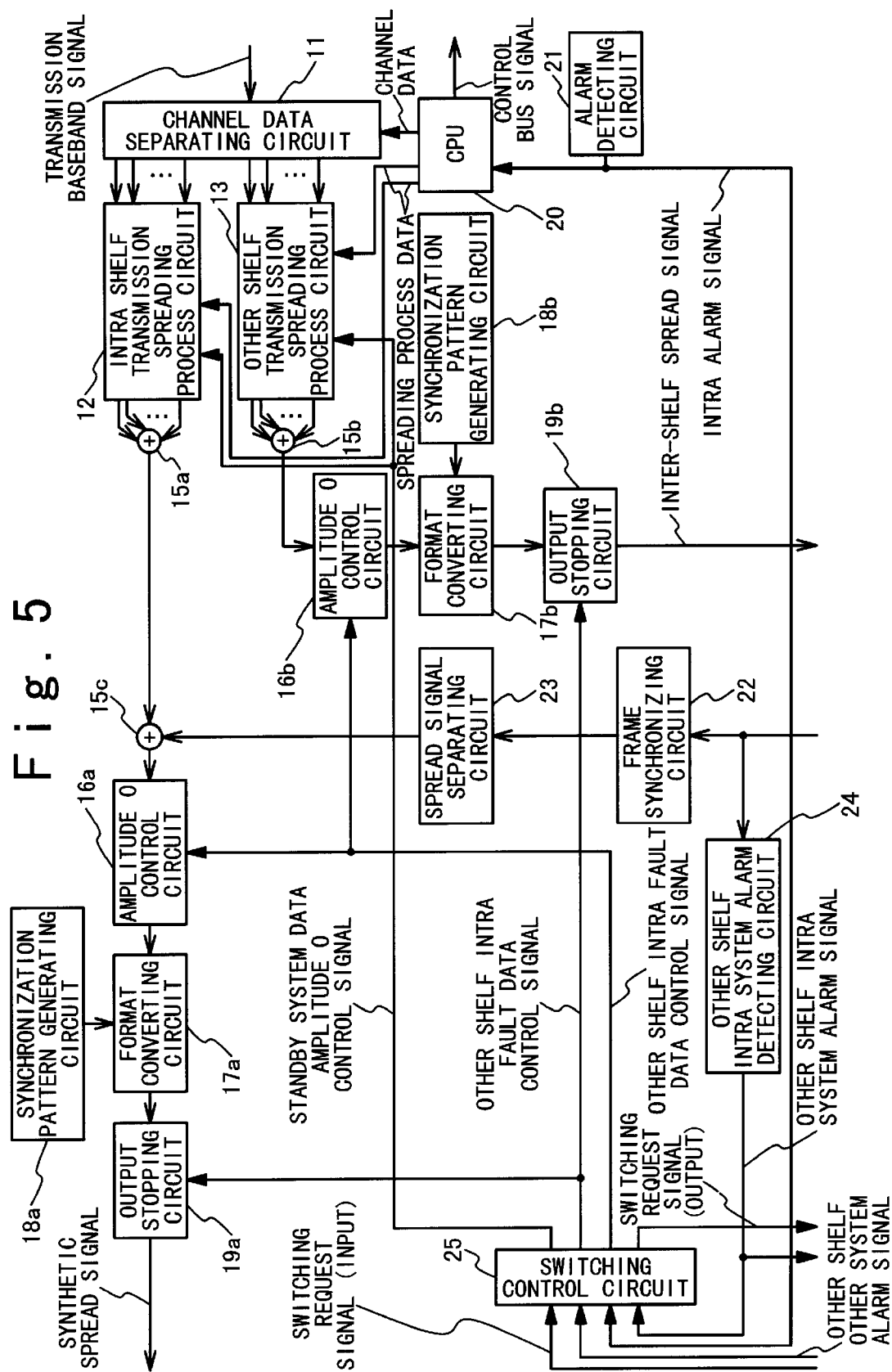
FIG. 5 is a block diagram showing an example of the structure of a transmission signal processing circuit of the radio base station apparatus according to the first embodiment of the present invention.

FIG. 5 is a block diagram showing a configuration example of each of the transmission signal processing circuit 5a to 5d in the radio base station apparatus shown in FIG. 4. The respective 10 transmission signal processing circuits have the same configuration. Here, the transmission signal processing circuit 5a will be described. In FIG. 5, a channel data separating circuit 11 separates individual channels from a transmission baseband signal, in which a time divisional multiplexing is carried out to data for a plurality of channels received from the merging circuit 7a. Then, the channel data separating circuit 11 converts data on the channels into user data corresponding to a data rate for each user. Then, the channel data separating circuit 11 outputs the user data to an intra shelf transmission spreading process circuit 12 and another shelf transmission spreading process circuit 13, in accordance with the channel data from a CPU 20.

The channel data is used to determine whether each user data should be sent from the intra shelf or the other shelf and whether the user data should be processed by current use system spreading circuits or standby system spreading circuits in the spreading process circuits 12 and 13. The channel data separating circuit 11 selects the user data to be sent by the intra shelf (shelf 2), and outputs to the intra shelf transmission spreading process circuit 12. Also, the channel data separating circuit 11 selects the user data to be sent by the other shelf (shelf 3) and then outputs to the other shelf transmission spreading process circuit 13.

The intra shelf transmission spreading process circuit 12 and the other shelf transmission spreading process circuit 13 carry out the spreading modulation to the user data whose data rates are different from each other, in accordance with the spreading process data from the CPU 20, and output spread signals to addition synthesizers 15a and 15b.

The addition synthesizer 15b adds all the spread signals for the respective users to be outputted to the other shelf (shelf 3), and outputs to the transmission signal processing circuits 5c in the other shelf through an amplification 0 control circuit 16b, a format converting circuit 17b and an output stopping circuit 19b. Although the transmission signal processing circuits 5c of the other shelf similarly sends the transmission spread signal to the transmission signal processing circuit 5a, this transmission spread signal is received by a frame synchronizing circuit 22 in the transmission signal processing circuit 5a. The frame synchronizing circuit 22 establishes frame synchronization with the transmission spread signal inputted from the other shelf. A spread signal separating circuit 23 separates this transmission spread signal, and outputs to an addition synthesizer 15c. Also, the addition synthesizer 15a adds all the spread signals for the respective users to be outputted to the intra shelf (shelf 2), and outputs to the addition synthesizer 15c. The addition synthesizer 15c adds the spread signal from the addition synthesizer 15a and the spread signal separating circuit 23, and outputs as the transmission spread signal to the radio transmission processing circuit 8a through a amplitude 0 control circuit 16a, a format converting circuit 17a and an output stopping circuit 19a.

Synchronous pattern generating circuits 18a, 18b respectively generate synchronization patterns, and output to the format converting circuits 17a and 17b. The format converting circuits 17a and 17b carry out the insertions of the synchronization patterns into the spread signals, and convert the spread signals to have formats for transmissions to the radio transmission processing circuit 8a or the other shelf.

The control signals and circuits used in a setting switching operation in a case of fault occurrence will be described below. A switching control circuit 25 outputs various control signals to carry out an optimal switching operation in accordance with respective input alarm signals and switching request signals. When receiving an intra fault data control signal from the switching control circuit 25, each of the output stopping circuits 19a and 19b sets an output bus at a high impedance state to stop the data output. When receiving an other shelf intra system fault data control signal from the switching control circuit 25, each of the amplitude 0 control circuits 16a and 16b fixes an amplitude of the spread signal to 0. When receiving a standby system data amplitude 0 control signal from the switching control circuit 25, each of the intra shelf transmission spreading process circuit 12 and the other shelf transmission spreading process circuit 13 carries out a predetermined process. This process will be described later.

By the way, the intra system implies a transmission route system that is attained by an inter-shelf connection as a corresponding transmission signal processing circuit, and the other system implies a system that is not attained by the inter-shelf connection. For example, with respect to the transmission signal processing circuit 5a, the transmission signal processing circuits 5c is for the intra system, and the transmission signal processing circuit 5b and 5d are for the other system.

An alarm detecting circuit 21 detects a fault in the transmission signal processing circuit 5a, and outputs an intra alarm signal to the switching control circuit 25 and the CPU 20. At this time, the CPU 20 sends and receives data through a control bus to and from the call process & monitor controlling circuit 4, and notifies the status data in the transmission signal processing circuit 5a. Also, other shelf intra system alarm detecting circuit 24 detects the fault from the stop of the inter-shelf spread signal received from the other shelf, and outputs other shelf intra system alarm signal to the switching control circuit 25. The other shelf intra system alarm signal is inputted as other shelf other system alarm signal to the switching control circuit 25 of the other transmission signal processing circuits 5b in the intra shelf (shelf 2). Similarly, the other shelf intra system alarm detecting circuit 24 in the transmission signal processing circuit 5b also outputs the other shelf intra system alarm signal. This signal is received as the other shelf other system alarm signal by the switching control circuit 25 in the transmission signal processing circuit 5a. Also, the switching control circuit 25 outputs the switching request signal to the switching control circuit 25 of the other transmission signal processing circuits 5b in the intra shelf, in response to the input alarm signal. Similarly, the switching control circuit 25 of the transmission signal processing circuit 5b outputs the switching request signal to the switching control circuit 25 of the transmission signal processing circuit 5a.

Figure 7:
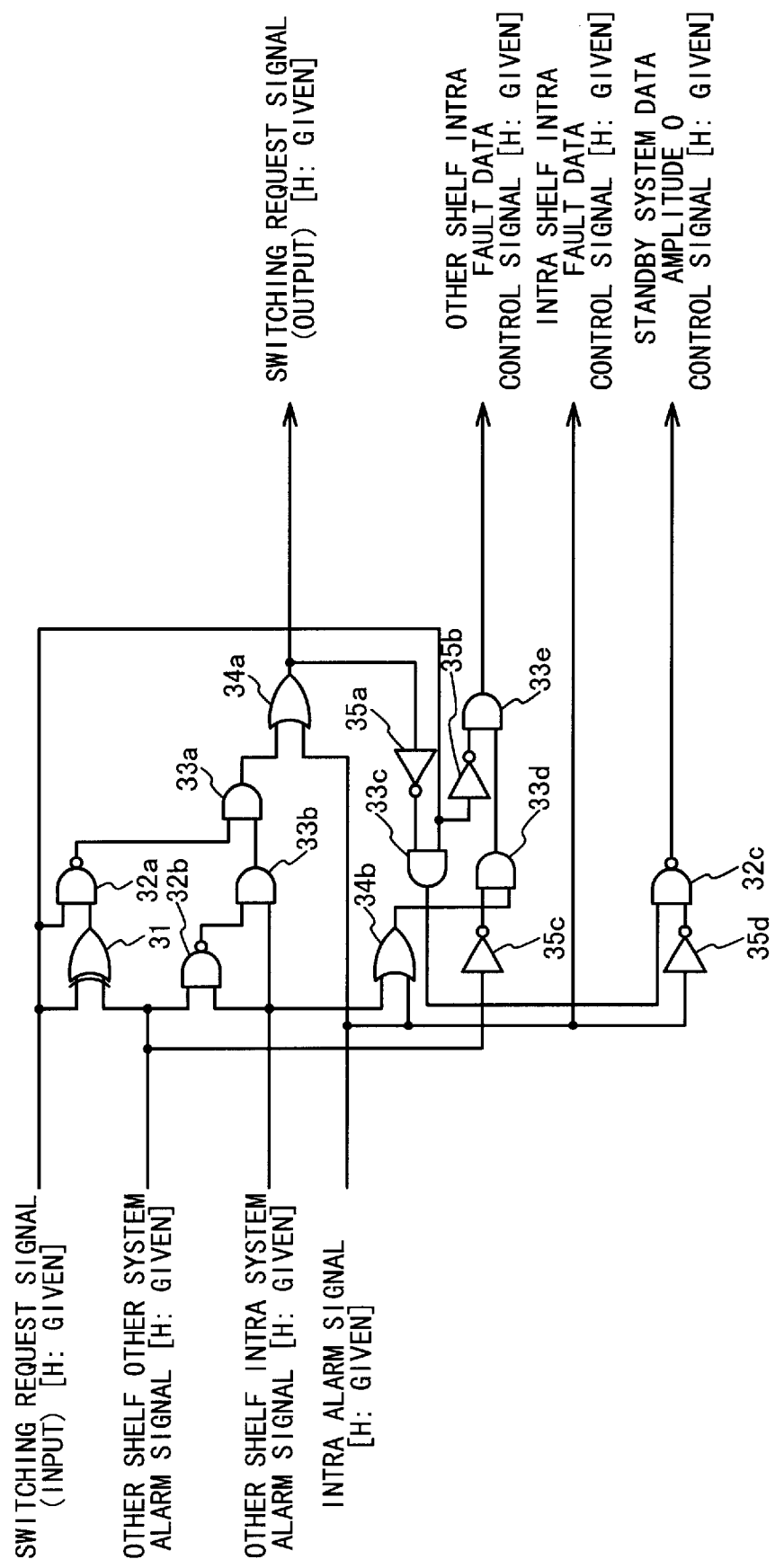
FIG. 7 is a circuit diagram showing an example of the structure of a switching control circuit of the transmission signal processing circuit of FIG. 5.

Also, the switching control circuit 25 sets and outputs the intra fault data control signal, the other shelf intra system fault data control signal, the standby system data amplitude 0 control signal and the switching request signal shown in FIG. 6, on the basis of the combination of the input switching request signal, the self-alarm signal, the other shelf intra system alarm signal and the other shelf other system alarm signal. FIG. 7 shows a configuration example of the switching control circuit 25. This switching control circuit 25 is a logical circuit for attaining a truth table shown in FIG. 6. It is composed of an EXOR (exclusive OR) gate 31, NAND gates 32a to 32c, AND gates 33a to 33e, OR gates 34a, 34b, and NOT gates 35a to 35d.

Figure 8:
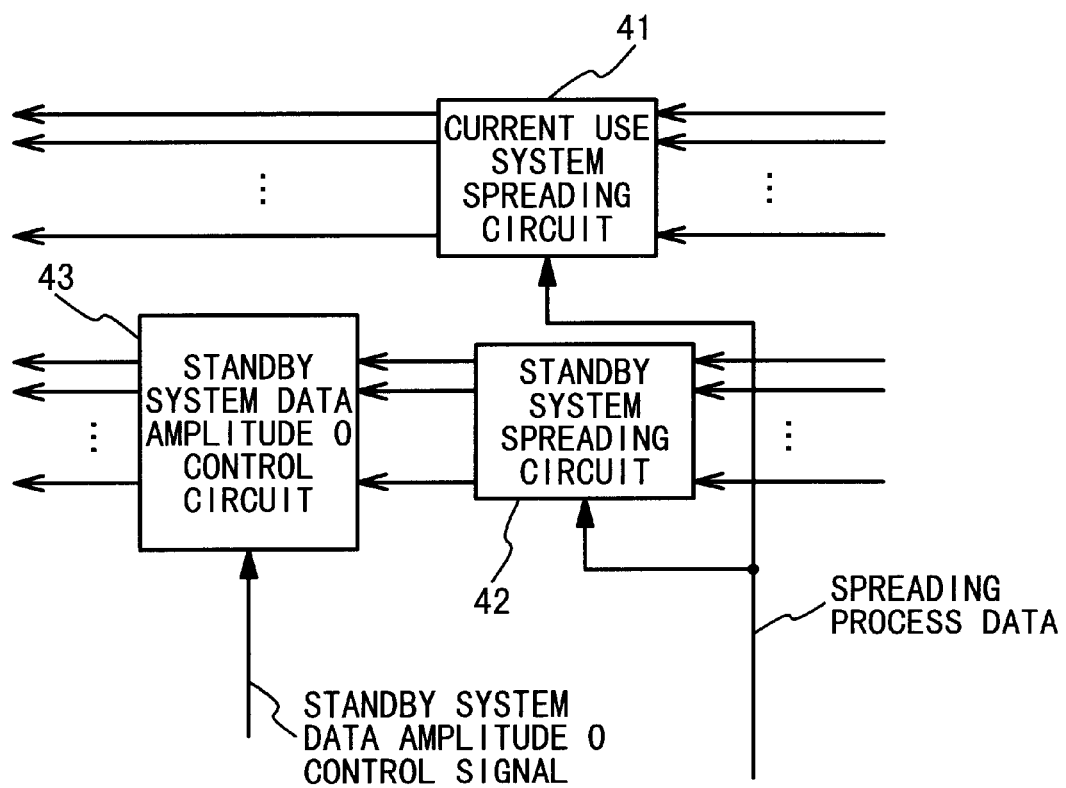
FIG. 8 is a block diagram showing an example of the structure of a spreading process circuit for intra shelf transmission and a spreading process circuit for standby shelf transmission.

The intra shelf transmission spreading process circuit 12 and the other shelf transmission spreading process circuit 13 will be described below. The configurations of both the processors 12 and 13 are equal to each other. FIG. 8 shows an example of the configuration. Each of the intra shelf transmission spreading process circuit 12 and the other shelf transmission spreading process circuit 13 has a current use system spreading circuit 41, a standby system spreading circuit 42 and a standby system data amplitude 0 control circuit 43. The current use system spreading circuit 41 carries out a spreading process to a current use system user data received from the channel data separating circuit 11. The standby system spreading circuit 42 carries out the spreading process to a standby system user data received from the channel data separating circuit 11. The settings of spreading codes in these spreading circuits 41 and 42 are carried out on the basis of the spreading process data received from the CPU 20.

The standby system user data is the data that is outputted from the other transmission signal processing circuits in the shelf in the normal state. When a fault has occurred in the other transmission signal processing circuits, the standby system spreading circuit 42 compensates this transmission signal processing circuits. Here, the compensation implies the output of data to be originally outputted from the other transmission signal processing circuits in the shelf. The standby system data amplitude 0 control circuit carries out control in the normal state so that the amplitude of the spread signal outputted from the standby system spreading circuit 42 is fixed to 0. When the standby system data amplitude 0 control signal is received as "cancellation" from the switching control circuit 25, the standby system data amplitude 0 control circuit cancels the amplitude 0 control, and begins to output the standby system spread signal.

Figure 9:
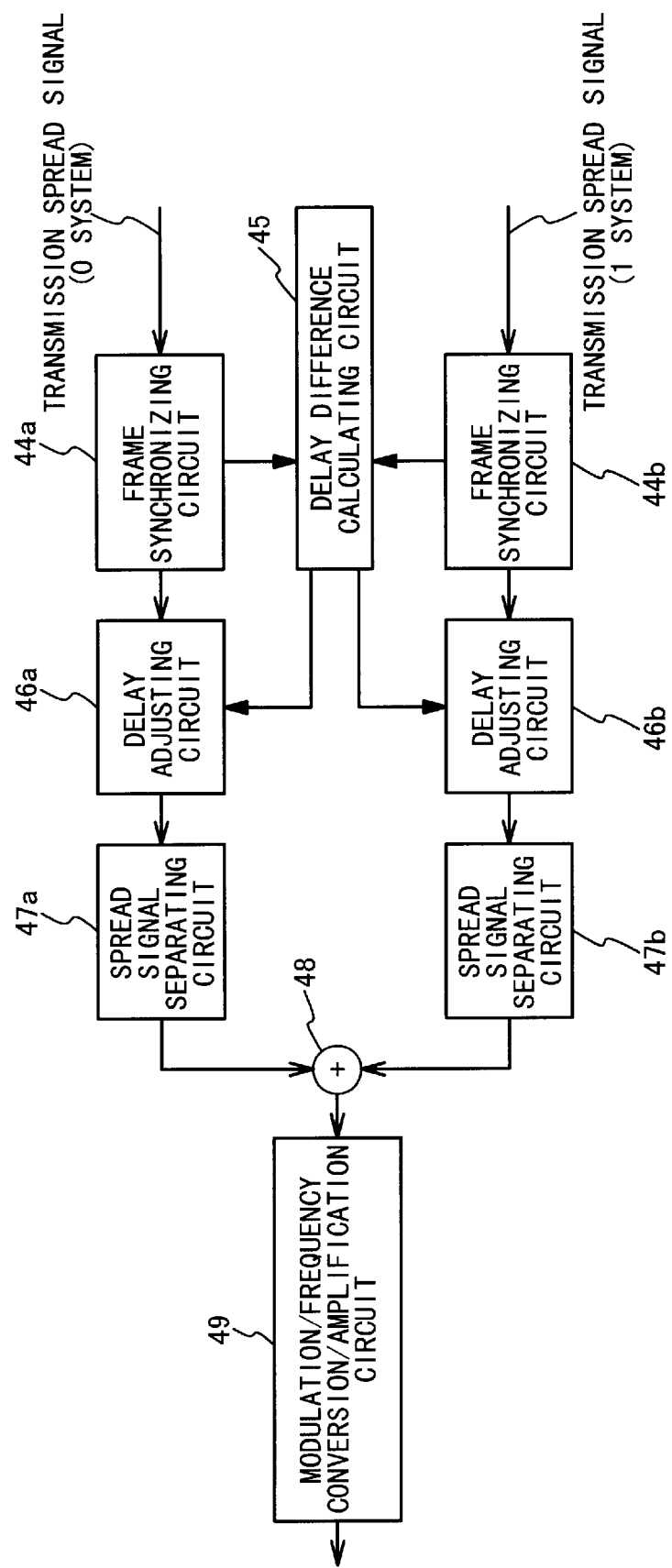
FIG. 9 is a block diagram showing an example of the structure of a radio transmission processing circuit of the transmission signal processing circuit of FIG. 5.

The configuration of the radio transmission processing circuit 8a will be described below. FIG. 9 is a block diagram showing a configuration example of the radio transmission processing circuit 8a. Each of frame synchronizing circuits 44a and 44b establishes the frame synchronization with the transmission spread signal received from a corresponding one of the transmission signal processing circuits 5a and 5b. A delay difference calculating circuit 45 calculates a delay difference between both the transmission spread signals. Delay adjusting circuits 46a and 46b make both timings coincide with each other. Each of spread signal separating circuits 47a and 47b separates the spread signal. An adder 48 adds and synthesizes the signals. A modulation, frequency conversion and amplification circuit 49 carries out orthogonal modulation, radio frequency conversion and amplification to the spread signal received from the adder 48 to output to the antenna 9a.

By the way, in this radio base station apparatus, when not carrying out the transmission, the call process & monitor controlling circuit 4 produces the coding process data as invalid data (for example, a signal whose amplitude is 0) or does not set the circuit for carrying out the spreading process in the channel data.

A redundancy switching operation in a case of fault occurrence will be described below. FIGS. 10 to 13 are sequence diagrams showing sequences of the redundancy switching operation at the time of the fault occurrence. Numerals shown in FIGS. 10 to 13 denote respective states in the truth table in FIG. 6. Also, a signal system processed by the transmission signal processing circuit 5a and 5c in FIG. 4 is referred to as a 0-system, and a signal system processed by the transmission signal processing circuit 5c and 5d is referred to as a 1-system.

Figure 10:
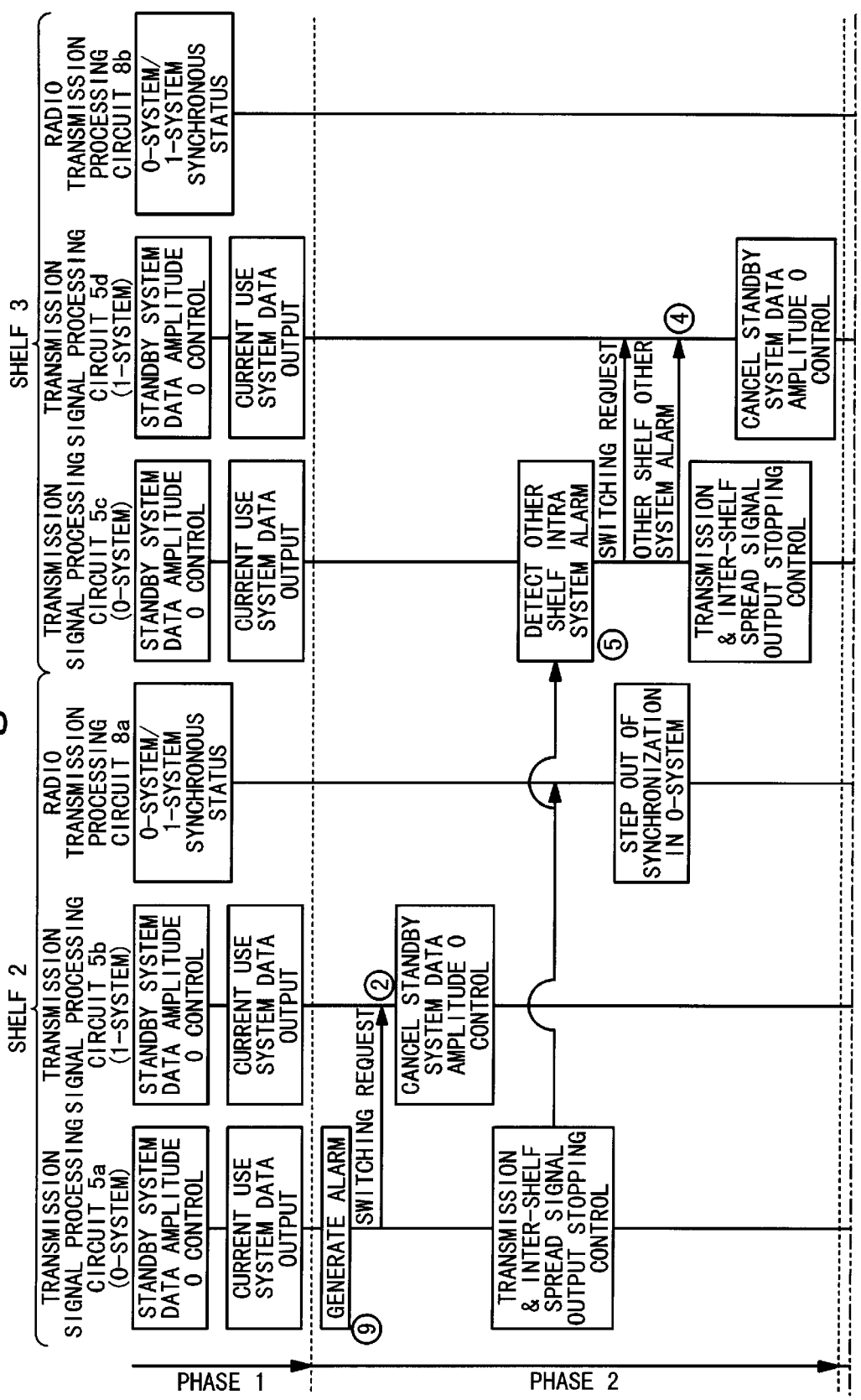
FIGS. 10 to 13 are diagrams showing sequences of a redundant switching operation in case of fault occurrence.

A phase 1 shown in FIG. 10 indicates a normal state. The signals supplied to the switching control circuits 25 in each of the transmission signal processing circuits 5a to 5d are all at L (canceled). At this time, each switching control circuit 25 sets and outputs only the standby system data amplitude 0 control signal at H (State 1). Thus, each of the standby system data amplitude 0 control circuits 43 in the intra shelf transmission spreading process circuit 12 and the other shelf transmission spreading process circuit 13 fixes to 0 the amplitude of the spread signal outputted from the standby system spreading circuit 42. Also, each of the radio transmission processing circuits 8a and 8b is in a synchronization state with respect to the 0-system and the 1-system.

A phase 2 indicates a sequence when the alarm detecting circuit 21 in any of the transmission signal processing circuit detects a fault. Here, an example will be described in which a fault has occurred in the transmission signal processing circuit 5a. The alarm detecting circuit 21 of the transmission signal processing circuit 5a outputs an intra alarm signal (H) to the CPU 20 and the switching control circuit 25. Thus, the switching control circuit 25 changes to a state 9, and outputs a switching request signal (H) to the transmission signal processing circuit 5b, and outputs an intra fault data control signal (H) to the output stopping circuits 19a and 19b. Each of the output stopping circuits 19a and 19b stops the transmission spread signal outputted to the radio transmission processing circuit 8a and the inter-shelf spread signal outputted to the transmission signal processing circuits 5c. Also, the radio transmission processing circuit 8a changes to an asynchronous state because of the fault of the transmission spread signal or the output stop with regard to the 0-system.

When receiving the switching request signal from the transmission signal processing circuit 5a, the switching control circuit 25 in the transmission signal processing circuits 5b changes to a state 2, and cancels the standby system data amplitude 0 control signal. Thus, in the transmission signal processing circuits 5b, each of the standby system data amplitude 0 control circuits 43 in the intra shelf transmission spreading process circuit 12 and the other shelf transmission spreading process circuit 13 cancels the amplitude 0 control. Thereafter, each of the standby system data amplitude 0 control circuits 43 begins to output the standby system spread signal.

The other shelf intra system alarm detecting circuit 24 in the transmission signal processing circuits 5c detects the output stop of the inter-shelf spread signal from the transmission signal processing circuit 5a, and outputs the other shelf intra system alarm signal (H) to the switching control circuit 25 and the transmission signal processing circuits 5d. The switching control circuit 251 changes to a state 5 in response to this signal, and outputs the switching request signal (H) to the transmission signal processing circuits 5d, and outputs the other shelf intra system fault data control signal (H) to the amplitude 0 control circuits 16a and 16b. Each of the amplitude 0 control circuits 16a and 16b fixes to 0, an amplitude of the transmission spread signal to be outputted to the radio transmission processing circuit 8b and an amplitude of the inter-shelf spread signal to be outputted to the transmission signal processing circuit 5a.

When receiving the switching request signal and the other shelf other system alarm signal from the transmission signal processing circuits 5c, the switching control circuit 25 in the transmission signal processing circuits 5d changes to a state 4, and releases the standby system data amplitude 0 control signal. Thus, in the transmission signal processing circuits 5d, each of the standby system data amplitude 0 control circuits 43 in the intra shelf transmission spreading process circuit 12 and the other shelf transmission spreading process circuit 13 cancels the amplitude 0 control, and begins to output the standby system spread signal.

Figure 11:
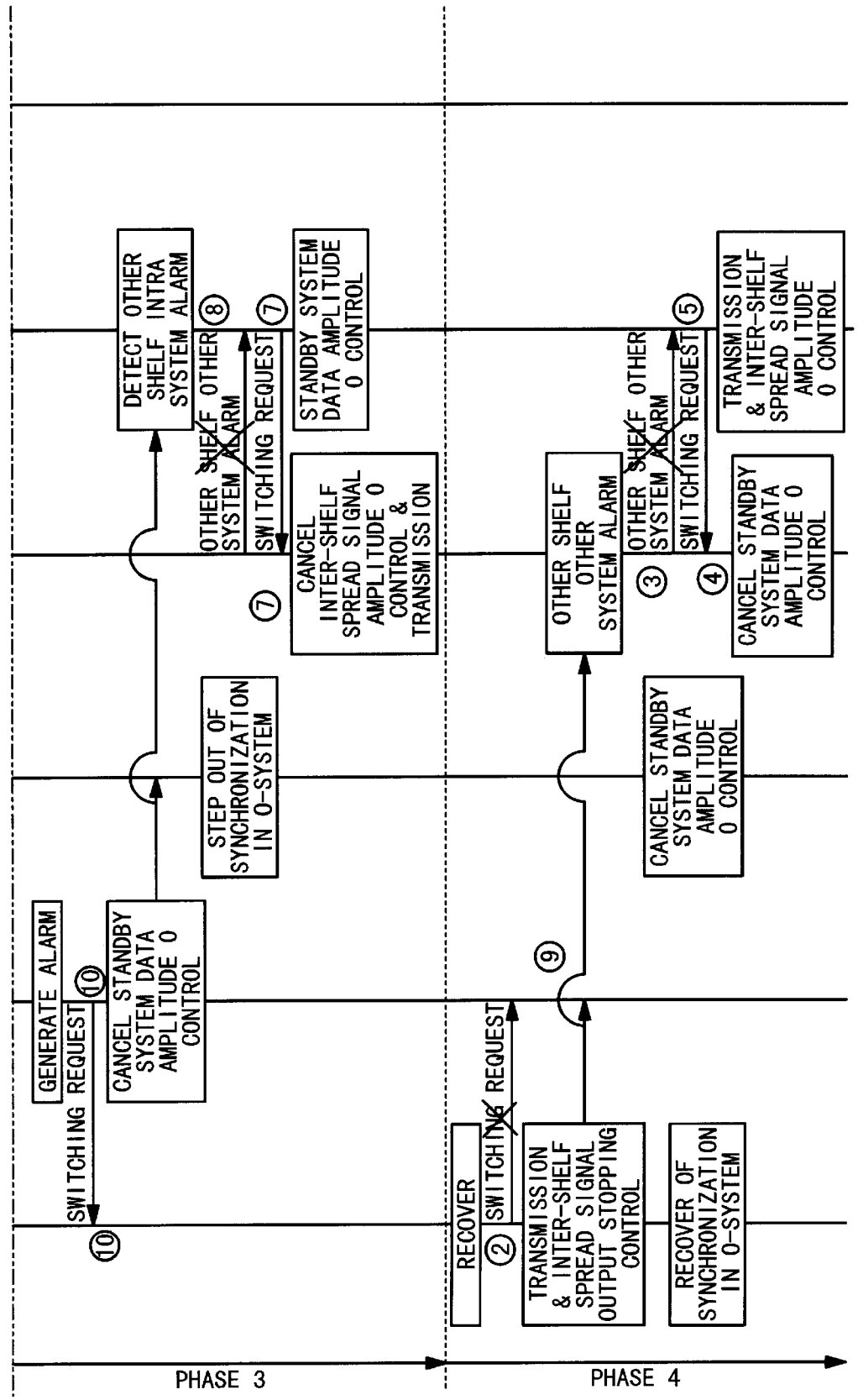

A phase 3 of FIG. 11 indicates a sequence when a fault has further occurred even in the other transmission signal processing circuits in the shelf in which the fault has occurred at the phase 2. Here, a case will be described in which the alarm detecting circuit 21 in the transmission signal processing circuits 5b detects the fault. In the transmission signal processing circuit 5b, the alarm detecting circuit 21 outputs the intra alarm signal (H) to the CPU 20 and the switching control circuit 25. Thus, the switching control circuit 25 changes to a state 10, and outputs the switching request signal (H) to the transmission signal processing circuit 5a, and sets the standby system data amplitude 0 control signal to H. Therefore, in the transmission signal processing circuits 5b, each of the standby system data amplitude 0 control circuits in the intra shelf transmission spreading process circuit 12 and the other shelf transmission spreading process circuit 13 fixes the amplitude of the standby system spread signal to 0. Also, the switching control circuit 25 outputs the intra fault data control signal (H) to the output stopping circuits 19a and 19b. Each of the output stopping circuits 19a and 19b stops the output of the transmission spread signal to the radio transmission processing circuit 8a and the output of the inter-shelf spread signal to the transmission signal processing circuits 5d. Also, the radio transmission processing circuit 8a changes to the asynchronous state because of the fault of the transmission spread signal or the output stop with regard to the 1-system.

When receiving the switching request signal from the transmission signal processing circuits 5b, the switching control circuit 25 of the transmission signal processing circuit 5a changes to the state 10, and continues the process in the phase 2.

The other shelf intra system alarm detecting circuit 24 in the transmission signal processing circuit 5d detects the output stop of the inter-shelf spread signal from the transmission signal processing circuit 5b, and outputs the other shelf intra system alarm signal (H) to the switching control circuit 25 and the transmission signal processing circuit 5c. When receiving the other shelf intra system alarm signal, the switching control circuit 25 changes to a state 8.

When receiving the other shelf other system alarm signal from the transmission signal processing circuits 5d, the switching control circuit 25 of the transmission signal processing circuit 5c changes to a state 7, and cancels the switching request signal. Also, the switching control circuit 25 cancels the other shelf intra system fault data control signal. Thus, each of the amplitude 0 control circuits 16a and 16b cancels the amplitude 0 fixings of the transmission spread signal to be outputted to the radio transmission processing circuit 8b and the inter-shelf spread signal to be outputted to the transmission signal processing circuit 5a.

The switching control circuit 25 of the transmission signal processing circuit 5d changes to the state 7 since the switching request signal from the transmission signal processing circuit 5c is canceled. Thus, the switching control circuit 25 sets the standby system data amplitude 0 control signal to H. Therefore, in the transmission signal processing circuit 5d, each of the standby system data amplitude 0 control circuits in the intra shelf transmission spreading process circuit 12 and the other shelf transmission spreading process circuit 13 fixes the amplitude of the standby system spread signal to 0.

A phase 4 of FIG. 11 indicates a sequence when one of the two transmission signal processing circuits having the faults at the phase 3 is recovered. Here, a case will be described in which the transmission signal processing circuit 5a is recovered. The alarm detecting circuit 21 of the transmission signal processing circuit 5a cancels the intra alarm signal, and the switching control circuit 25 changes to a state 2. Thus, the switching control circuit 25 cancels the switching request signal and the intra fault data control signal. Each of the output stopping circuits 19a and 19b begins to output the transmission spread signal to the radio transmission processing circuit 8a and the inter-shelf spread signal to the transmission signal processing circuits 5c. Also, the switching control circuit 25 cancels the standby system data amplitude 0 control circuit. Therefore, in the transmission signal processing circuit 5a, each of the standby system data amplitude 0 control circuits in the intra shelf transmission spreading process circuit 12 and the other shelf transmission spreading process circuit 13 cancels the amplitude 0 control, and begins to output the standby system spread signal. Also, the radio transmission processing circuit 8a establishes the synchronization with regard to the 0-system, and starts the radio transmission process of the transmission spread signal.

The switching control circuit 25 of the transmission signal processing circuit 5b in which the switching request signal from the transmission signal processing circuit 5a is released changes to a state 9, and continues the process at the state 3.

The other shelf intra system alarm detecting circuit 24 in the transmission signal processing circuits 5c detects an output start of the inter-shelf spread signal in the transmission signal processing circuit 5a, and cancels the other shelf intra system alarm signal outputted to the switching control circuit 25 and the transmission signal processing circuits 5d. The switching control circuit 25 in which the other shelf intra system alarm signal is canceled changes to the state 3.

The switching control circuit 25 of the transmission signal processing circuits 5d in which the other shelf other system alarm signal from the transmission signal processing circuit 5c is canceled changes to a state 5, and outputs the switching request signal (H) to the transmission signal processing circuit 5c. Also, the switching control circuit 25 outputs the other shelf intra system fault data control signal (H). Thus, each of the amplitude 0 control circuits 16a and 16b fixes to 0 the amplitudes of the transmission spread signal to be outputted to the radio transmission processing circuit 8b and the inter-shelf spread signal to be outputted to the transmission signal processing circuits 5b.

The switching control circuit 25 of the transmission signal processing circuit 5c receives the switching request signal from the transmission signal processing circuit 5d, and changes to the state 4. Thus, the switching control circuit 25 cancels the standby system data amplitude 0 control signal. Therefore, in the transmission signal processing circuit 5c, each of the standby system data amplitude 0 control circuits in the intra shelf transmission spreading process circuit 12 and the other shelf transmission spreading process circuit 13 begins to output the standby system spread signal.

Figure 12:
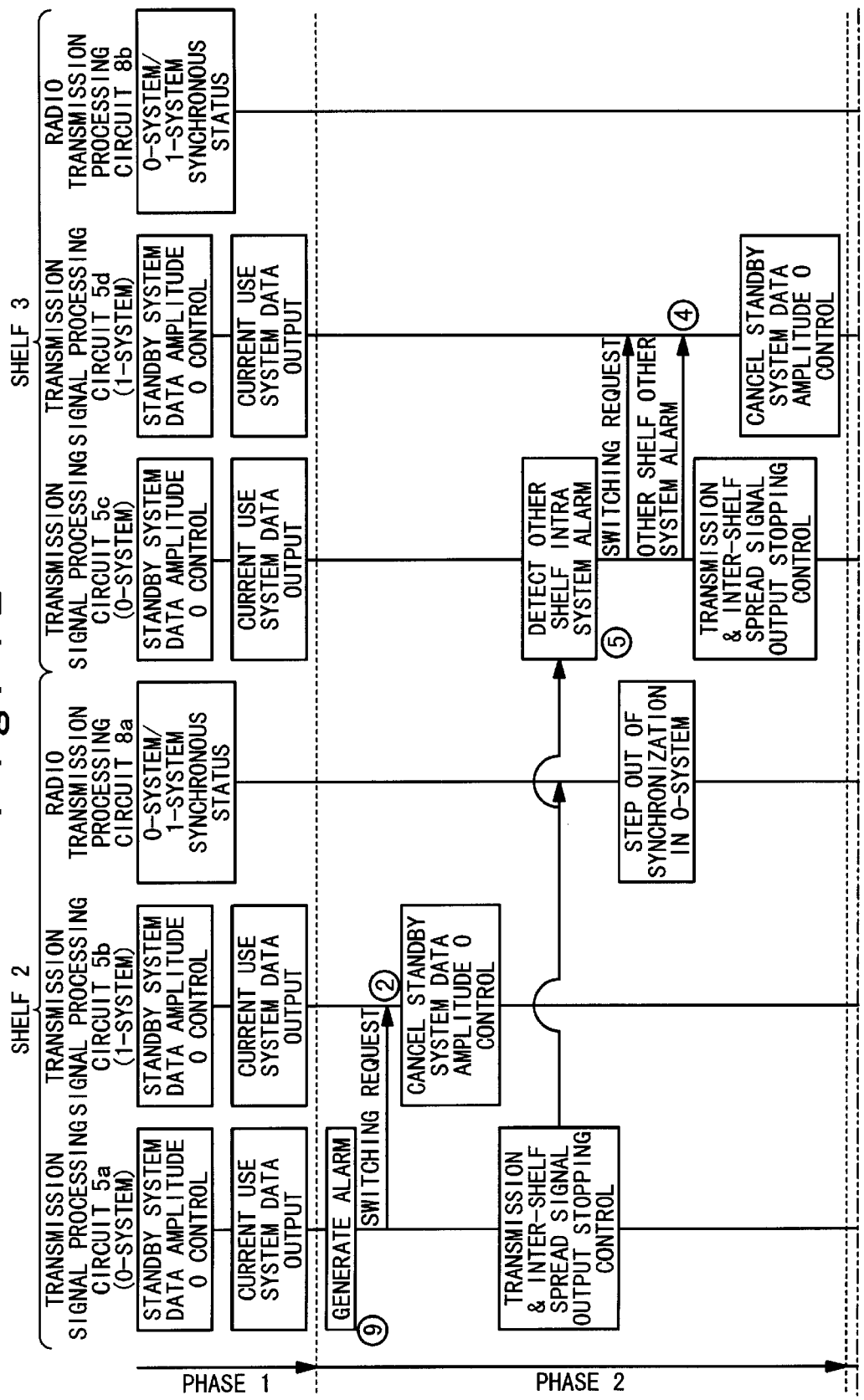
Figure 13:
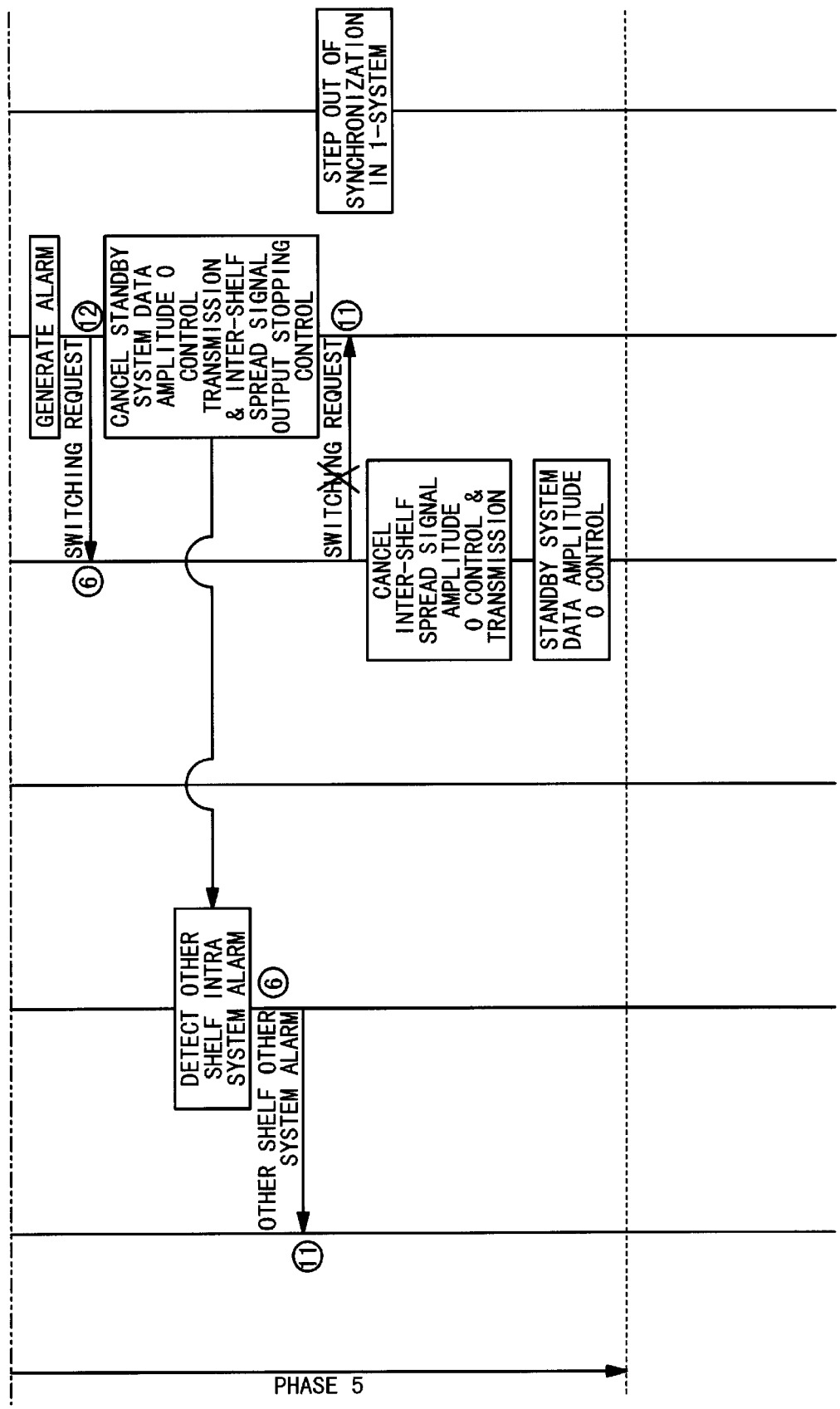

The sequence shown in FIGS. 12 and 13 will be described below. In FIG. 12, the phases 1 and 2 are similar to those of the sequence shown in FIG. 10. A phase 5 of FIG. 13 indicates a sequence when a fault has occurred even in the other shelf other system transmission signal processing circuits after the phase 2. Here, a case will be described in which a fault has occurred in the transmission signal processing circuits 5d.

In the transmission signal processing circuit 5d, the alarm detecting circuit 21 outputs the intra alarm signal (H) to the CPU 20 and the switching control circuit 25. Thus, the switching control circuit 25 changes to a state 12, and outputs the switching request signal (H) to the transmission signal processing circuit 5c, and outputs the self fault data control signal (H) to the output stopping circuits 19a and 19b. Each of the output stopping circuits 19a and 19b stops the output of the transmission spread signal to the radio transmission processing circuit 8b and the output of the inter-shelf spread signal to the transmission signal processing circuits 5b. Also, the radio transmission processing circuit 8b changes to the asynchronous state because of the fault of the transmission spread signal or the output stop with regard to the 1-system.

The switching control circuit 25 of the transmission signal processing circuit 5c receives the switching request signal from the transmission signal processing circuit 5d, and changes to a state 6. Thus, the switching control circuit 25 cancels the switching request signal. Also, the switching control circuit 25 cancels the other shelf intra system fault data control signal. Therefore, each of the amplitude 0 control circuits 16a and 16b cancels the amplitude 0 fixation of the transmission spread signal outputted to the radio transmission processing circuit 8b and the amplitude 0 fixation of the inter-shelf spread signal outputted to the transmission signal processing circuit 5a. Also, the switching control circuit 25 cancels the standby system data amplitude 0 control signal. Therefore, in the transmission signal processing circuits 5c, each of the standby system data amplitude 0 control circuits in the intra shelf transmission spreading process circuit 12 and the other shelf transmission spreading process circuit 13 begins to output the standby system spread signal.

The switching control circuit 25 of the transmission signal processing circuit 5d changes to a state 11 since the switching request signal from the transmission signal processing circuit 5c is canceled. However, the process in the transmission signal processing circuit 5d is not changed. The stop of the output of the transmission spread signal to the radio transmission processing circuit 8b and the output of the inter-shelf spread signal to the transmission signal processing circuits 5b is continued.

The other shelf intra system alarm detecting circuit 24 in the transmission signal processing circuit 5b detects the output stop of the inter-shelf spread signal from the transmission signal processing circuits 5d. Then, the other shelf intra system alarm detecting circuit 24 outputs the other shelf intra system alarm signal (H) to the switching control circuit 25 and the transmission signal processing circuit 5a. The switching control circuit 25 changes to the state 6 in response to this signal. Also, the switching control circuit 25 in the transmission signal processing circuit 5a receives the other shelf other system alarm signal from the transmission signal processing circuit 5b, and changes to the state 11. However, the transmission signal processing circuits 5a and 5b continue the process at the phase 2.

FIGS. 10 to 13 illustrate the case when the fault has occurred in the particular transmission signal processing circuits, such as the transmission signal processing circuit 5a, as the explanations of the respective phases. However, even if the fault has occurred in the other transmission signal processing circuit, their sequences are similar to those of the above-mentioned respective phases.

In the radio base station apparatus having the above-mentioned configuration, the baseband signals generated by the channel coding process circuits 6a and 6b in the shelf 2 can be sent not only from the radio transmission processing circuit 8a in the intra shelf (shelf 2) but also from the radio transmission processing circuit 8b in the other shelf (shelf 3). Similarly, the baseband signals generated by the channel coding process circuits 6c and 6d in the shelf 3 can be also sent from the radio transmission processing circuits 8a and 8b. Thus, the further optimal radio communication system can be produced by selecting the antenna and the transmission frequency for an electric wave environment such as fading around the radio base station apparatus. Also, if one shelf is short of the resources of the channel coding process circuit, and spreading process circuit or if a fault has occurred in the radio transmission processing circuit or the antenna, the operation can be continued by using the other channel coding process circuit, spreading process circuit, radio transmission processing circuit and antenna within the allowable range of the resources in the apparatus.

When the radio base station apparatus is designed in such a manner that the baseband signals sent from the channel coding process circuits 6a and 6d are directly inputted to the other shelf at the time of the execution of the inter-shelf communication, if the number of units of the channel coding process circuit is increased in conjunction with the increase in the number of channels, the number of lines to the other shelf is increased. However, the present invention is designed such that the transmission signal processing circuits 5a to 5d select only the data which needs to be sent to the other shelf, among the transmission baseband signals received from the plurality of units in the channel coding process circuit, and multiplex after the spreading process, and then carry out the inter-shelf communication. Thus, it is possible to simplify the cable line, and he apparatus configuration.

Also, in the above-mentioned radio base station apparatus, when the fault has occurred in the transmission signal processing circuit 5a in the shelf 2 at the phase 2, the transmission signal processing circuit 5a stops the output so that an erroneous data is not sent to the radio transmission processing circuit 8a and the transmission signal processing circuit 5c. The transmission signal processing circuit 5b outputs the spread signals of the standby system spreading circuit 42 as well as the current use system spreading circuit 41, and carries out the compensation for the 0-system. Also, the transmission signal processing circuit 5c in the shelf 3 fixes to 0, the amplitude of the spread signal to be outputted to the radio transmission processing circuit 8b and the transmission signal processing circuit 5a. The transmission signal processing circuit 5d outputs the spread signals of the standby system spreading circuit 42 as well as the current use system spreading circuit 41.

By the switching operation through the series of hardware operations, the spread signal generated in the intra shelf (shelf 2) and wirelessly sent can be quickly saved or switched into the 1-system. Also, the spread signal generated in the intra shelf and sent in the other shelf (shelf 3) through the inter-shelf communication, or the spread signal generated in the other shelf and sent in the intra shelf through the inter-shelf communication can be quickly saved or switched into the 1-system. Thus, the influence to the system can be suppressed to a minimum. Also, in the shelf 3 having no fault, the transmission signal processing circuit 5c outputs the synchronous pattern to the radio transmission processing circuit 8b. Therefore, it is possible to continue the synchronization between the 0-system and the 1-system, and also possible to cope with a next switching operation.

If the fault has occurred in the transmission signal processing circuit 5b in the intra shelf at the phase 3, the transmission signal processing circuit 5a receives the switching request signal from the transmission signal processing circuit 5b. However, the transmission signal processing circuit 5a continues the process at the phase 2 without any influence from the reception. If the faults have occurred in both the transmission signal processing circuits 5a and 5b in the shelf 2, the shelf 3 is returned from the state in which only the transmission signal processing circuit 5d outputs the spread signals of the current use system spreading circuit 41 and the standby system spreading circuit 42 to the state in which the transmission signal processing circuits 5c and 5d output the spread signal of the current use system spreading circuit 41 similarly to the normal time. At this time, the synchronization between the 0-system and the 1-system is continued as mentioned above. Thus, when the switching is carried out in the phase 3, there is no signal disconnection until the re-synchronization of the 0-system is established in the radio transmission processing circuit 8b. Therefore, it is possible to quickly process the transmission signal from the transmission signal processing circuit 5c.

The state of the shelf 3 at the phase 2 is the state corresponding to the above-mentioned third method. However, by the series of the switching operations at the phase 3, the state is recovered to the state corresponding to the second method. At the phase 3, the transmission signal processing circuits 5a and 5b in the shelf 2 are both at the fault state. Since the inter-shelf communication cannot be carried out, the state corresponding to the second method (the state at which the transmission signal processing circuits 5c and 5d output the spread signals) is the optimal state.

At the phase 4, if one transmission signal processing circuit 5a in the shelf 2 is recovered, the recovered transmission signal processing circuit 5a outputs the spread signals of the current use system spreading circuit 41 and the standby system spreading circuit 42, since the transmission signal processing circuit 5b is at the fault state. Also, in the shelf 3, in order to carry out the inter-shelf communication, the transmission signal processing circuit 5c outputs the spread signals of the current use system spreading circuit 41 and the standby system spreading circuit 42, and the transmission signal processing circuit 5d fixes the amplitude of the spread signal to 0.

The perfectly interrupted inter-shelf communication is quickly recovered through the series of the switching operations. Also, in the shelf 3, its state is switched from the state corresponding to the second method to the state corresponding to the third method. However, it can be said that this state is the optimal transmission route system in order to carry out the inter-shelf communication.

At the phase 5, if the fault has occurred in the transmission signal processing circuit 5d of the other shelf other system, the transmission signal processing circuit 5c is changed from the state at which the amplitude of the transmission spread signal is fixed to 0 to the state at which it outputs the spread signals of the current use system spreading circuit 41 and the standby system spreading circuit 42. Also, the transmission signal processing circuit 5b detects the output stop of the inter-shelf spread signal from the transmission signal processing circuit 5d. The transmission signal processing circuit 5a receives the other shelf other system alarm signal. However, the transmission signal processing circuits 5a and 5b continue the process at the phase 2.

At the phase 5, the inter-shelf communication cannot be carried out since the transmission signal processing circuits 5a and 5b are in the fault state. In this case, the transmission route system is optimal in which the transmission signal processing circuits 5b and 5c avoid the intra shelf other system fault with higher priority than the other shelf intra system fault. The quick change to such an optimal state can be attained even through the series of the switching operations at the phase 5.

Figure 14:
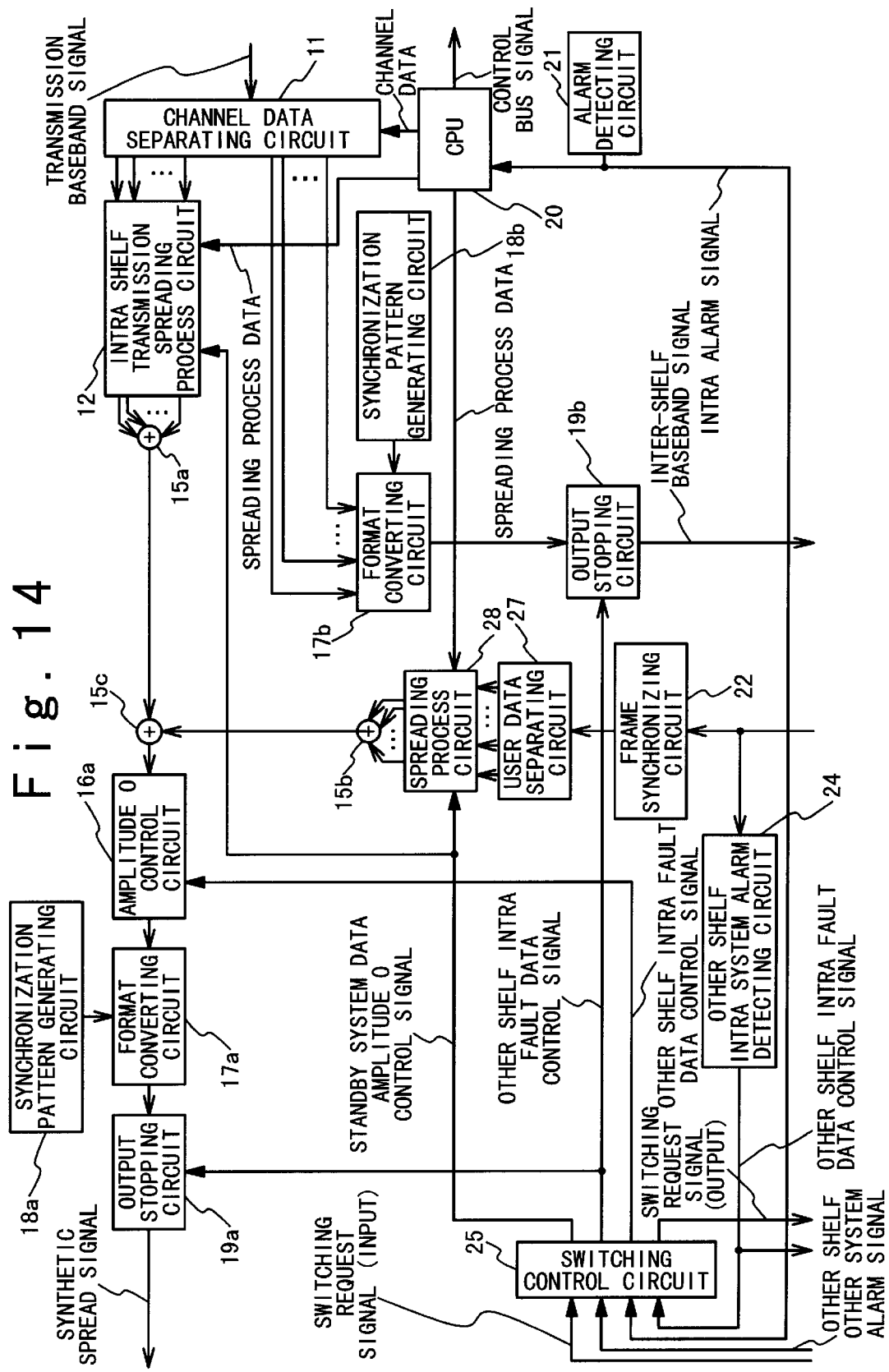
FIG. 14 is a block diagram showing an example of the structure of a transmission signal processing circuit of a second embodiment of the present invention.

Another embodiment of the present invention will be described below. FIG. 14 is a block diagram showing the configuration of transmission signal processing circuits 5a to 5d according to another embodiment of the present invention. In the configuration shown in FIG. 14, it does not have the other shelf transmission spreading process circuit. A channel data separating circuit 11 outputs a user data to be communicated between shelves, in an original state of a transmission baseband signal, to a transmission signal processing circuits in the other shelf other system through a format converting circuit 17b and an output stopping circuit 19b. That is, the user data is received and outputted between the shelves without any spreading process.

If the transmission baseband signal is received and outputted between the shelves, a frame synchronizing circuit 22 in each of the transmission signal processing circuits receives the transmission baseband signal from the transmission signal processing circuit in the other shelf intra system. The frame synchronizing circuit 22 establishes frame synchronization with the transmission baseband signal, and outputs to a user data separating circuit 27. The user data separating circuit 27 separates a plurality of user data to output to a spreading process circuit 28. The spreading process circuit 28 carries out a spreading process on the basis of a spreading process data received from the CPU 20. An addition synthesizer 15b adds all the spread signals for the respective users received from the spreading process circuit 28, and outputs to an addition synthesizer 15c. The addition synthesizer 15c adds the spread signals received from the addition synthesizers 15a and 15b to output to an amplitude 0 control circuit 16a. Also, an other shelf intra system alarm detecting circuit 24 outputs an other shelf intra system alarm signal in accordance with the stop of the transmission baseband signal communicated between the shelves.

The configurations and the operations of the other circuits are similar to those of the above-mentioned embodiments. The operation sequences when the faults have occurred in the respective transmission signal processing circuits are similar to those of the cases shown in FIGS. 10 to 13.

In the above-mentioned configuration, when the transmission signal processing circuit sends the user data to the transmission signal processing circuit in the other shelf intra system, the transmission signal processing circuit sends without carrying out the spreading process. Thus, even if the fault has occurred on the sending side, it is possible to reduce influence to the inter-shelf communication.

The above-mentioned respective embodiments may be designed such that each of the transmission signal processing circuits 5a to 5d does not have a transmission stop circuit 19b, and the switching control circuit 25 does not output to the output stopping circuit 19b but outputs the intra fault data control signal to the other shelf intra system alarm detecting circuit 24 in the transmission signal processing circuit in the other shelf intra system. FIG. 15 shows a configuration example of such a transmission signal processing circuit. When receiving the intra fault data control signal from the other shelf, the other shelf intra system alarm detecting circuit 24 outputs the other shelf intra system alarm signal. In the case of such configuration, not only the user data but also the control signal (intra fault data control signal) are received from and outputted to the transmission signal processing circuit in the other shelf intra system. By the way, the output stopping circuit 19a receives the intra fault data control signal from the switching control circuit 25, similarly to the respective embodiments.

The configurations and operations of the other circuits are similar to those of the above-mentioned embodiments. The operation sequences when the faults have occurred in the respective transmission signal processing circuits are similar to those of the cases shown in FIGS. 10 to 13, except that each of the other shelf intra system alarm detecting circuits 24 detects the fault, depending on not the stop of the inter-shelf spread signal but the intra fault data control signal.

FIG. 15 shows an example when the spread signal is received and outputted between the shelves. However, it may be designed such that even if a transmission baseband signal on which the spreading process is not carried out is received and outputted between the shelves without the transmission stop circuit 19b, the switching control circuit 25 outputs the intra fault data control signal to the other shelf intra system alarm detecting circuit 24 in the transmission signal processing circuit in the other shelf other system.

In such configuration, the fault in the other shelf intra system can be detected without the transmission stop circuit 19b. Thus, the size of the circuit can be made smaller.

According to the present invention, each transmission signal processing circuit in each shelf is designed such that the transmission signal processing circuit is connected to one of the duplex transmission signal processing circuit in the other shelf, and receives and outputs the transmission data. Thus, if one shelf is short of the resources of the channel coding process circuit, or the spreading process circuit or if the fault has occurred in the radio transmission processing circuit or the antenna, the operation can be continued by using the other shelf.

What is claimed is:

1. A radio base station apparatus comprising:
   first and second shelves,
   wherein said first shelf comprises:
      a first shelf current use system transmission signal processing circuit which generates a first inter-shelf signal from a first shelf current use system baseband signal, and generates a first shelf current use system spread signal from said first shelf current use system baseband signal and a second inter-shelf signal;
      a first shelf standby system transmission signal processing circuit which generates a third inter-shelf signal from a first shelf standby system baseband signal, and generates a first shelf standby system spread signal from said first shelf standby system baseband signal and a fourth inter-shelf signal; and
      a first shelf radio transmitting section which has a first shelf antenna and generates a first shelf radio signal from said first shelf current use system spread signal and said first shelf standby system spread signal to transmits from said first shelf antenna, and
   wherein said second shelf comprises:
      a second shelf current use system transmission signal processing circuit which generates said second inter-shelf signal from a second shelf current use system baseband signal, and generates a second shelf current use system spread signal from said second shelf current use system baseband signal and said first inter-shelf signal;
      a second shelf standby system transmission signal processing circuit which generates said fourth inter-shelf signal from a second shelf standby system baseband signal, and generates a second shelf standby system spread signal from said second shelf standby system baseband signal and said third inter-shelf signal; and
      a second shelf radio transmitting section which has a second shelf antenna and generates a second shelf radio signal from said second shelf current use system spread signal and said second shelf standby system spread signal to transmits from said second shelf antenna.

2. The radio base station apparatus according to claim 1, wherein said first shelf current use system transmission signal processing circuit comprises:
   a first output control circuit which stops output of said first shelf current use system spread signal in response to an output stop control signal;
   a detecting circuit which detects a fault in said first shelf current use system transmission signal processing circuit to generate an intra alarm signal; and
   a control circuit which outputs said output stop control signal to said first output control circuit in response to said intra alarm signal.

3. The radio base station apparatus according to claim 2, wherein said transmission signal processing circuit further comprises:
   a second output control circuit which stops output of said first inter-shelf signal in response to said output stop control signal.

4. The radio base station apparatus according to claim 2, wherein said first shelf current use system transmission signal processing circuit further comprises:
   a first amplitude control circuit which controls a spread signal corresponding to said first shelf current use system spread signal in response to a second shelf current use system fault signal such that amplitude of said spread signal is 0, and
   wherein said control circuit outputs said second shelf current use system fault signal to said first amplitude control circuit when said intra alarm signal or an alarm signal indicating a fault of said second shelf current use system transmission signal processing circuit is present and a switching signal from said first shelf standby system transmission signal processing circuit and an alarm signal indicating a fault of said second shelf standby system transmission signal processing circuit are not present.

5. The radio base station apparatus according to claim 4, wherein said transmission signal processing circuit further comprises:
   a second output control circuit which stops output of said first inter-shelf signal in response to said output stop control signal.

6. The radio base station apparatus according to claim 4, wherein said first shelf current use system transmission signal processing circuit further comprises:
   a second amplitude control circuit which controls a spread signal corresponding to said first inter-shelf signal in response to said second shelf current use system fault signal such that amplitude of said spread signal is 0.

7. The radio base station apparatus according to claim 4, wherein said first shelf current use system transmission signal processing circuit further comprises:
   an alarm detecting circuit which generates said alarm signal indicating the fault of said second shelf current use system transmission signal processing circuit based on no reception of said second inter-shelf signal from said second shelf current use system transmission signal processing circuit.

8. The radio base station apparatus according to claim 4, wherein said first shelf current use system transmission signal processing circuit further comprises:

an alarm detecting circuit which generates said alarm signal indicating the fault of said second shelf current use system transmission signal processing circuit based on an intra alarm signal generated in said second shelf current use system transmission signal processing circuit.

9. The radio base station apparatus according to claim 2, wherein said first shelf current use system transmission signal processing circuit comprises:

a channel separating circuit which separates said first shelf current use system baseband signal into first and second channel signals;

a first processing circuit which spreads and synthesizes said first channel signals into a first spread signal; and a second processing circuit which spreads and synthesizes said second channel signals into a second spread signal to output as said first inter-shelf signal.

10. The radio base station apparatus according to claim 9, wherein each of said first and second processing circuits includes a current use system spreading circuit and a standby system spreading circuit, and each of said first and second processing circuits sets to 0, amplitude of each of spread signals spread by a corresponding one of said standby system spreading circuits when said intra alarm signal of said first shelf current use system transmission signal processing circuit is not present and a switching request signal from said first shelf standby system transmission signal processing circuit is not present, and synthesizes the spread signals spread by the corresponding standby system spreading circuit without setting the amplitudes to 0, when said intra alarm signal of said first shelf current use system transmission signal processing circuit or said switching request signal from said first shelf standby system transmission signal processing circuit is present.

11. The radio base station apparatus according to claim 9, wherein said first shelf current use system transmission signal processing circuit further comprises:

a synthesizing circuit which synthesizes said first spread signal and an other spread signal as said second inter-shelf signal into a spread signal corresponding to said first shelf current use system spread signal.

12. The radio base station apparatus according to claim 2, wherein said first shelf current use system transmission signal processing circuit comprises:

a channel separating circuit which separates said first shelf current use system baseband signal into first and second channel signals;

a first processing circuit which spreads and synthesizes said first channel signals into a first spread signal; and a second processing circuit which converts said second channel signals into a baseband signal as said first inter-shelf signal.

13. The radio base station apparatus according to claim 12, wherein said first processing circuit includes a current use system spreading circuit and a standby system spreading circuit, and said first processing circuit sets to 0, amplitude of each of spread signals spread by said standby system spreading circuit when said intra alarm signal of said first shelf current use system transmission signal processing circuit is not present and a switching request signal from said first shelf standby system transmission signal processing circuit is not present, and synthesizes the spread signals spread signals spread by said standby system spreading circuit without setting the amplitudes to 0, when said intra alarm signal of said first shelf current use system transmission signal processing circuit or said switching request signal from said first shelf standby system transmission signal processing circuit is present.

14. The radio base station apparatus according to claim 12, wherein said first shelf current use system transmission signal processing circuit further comprises:

a synthesizing circuit which synthesizes said first spread signal and an other spread signal obtained from said second inter-shelf signal into a spread signal corresponding to said first shelf current use system spread signal.

15. The radio base station apparatus according to claim 14, wherein said first shelf current use system transmission signal processing circuit further comprises:

a second processing circuit which separates said second inter-self signal into third channel signals, and spreads and synthesizes said third channel signals into said other shelf spread signal.

* * * * *